(12) United States Patent
Bradbury et al.

(10) Patent No.: US 6,565,334 B1
(45) Date of Patent: May 20, 2003

(54) AXIAL FLOW FAN HAVING COUNTER-ROTATING DUAL IMPELLER BLADE ARRANGEMENT

(76) Inventors: Phillip James Bradbury, 13303 Via Stephen, Poway, CA (US) 92064; Phep Xuan Nguyen, 961 S. Idaho St. #267, Lahabda, CA (US) 90631; Chalmers R. Jenkins, 10727 E. San Salvador Dr., Scottsdale, AZ (US) 95258; Scott H. Frankel, 410 S. Perry La., Suite No.: 1, Tempe, AZ (US) 85281

( * ) Notice: Subject to any disclaimer, the term of this patent is extended or adjusted under 35 U.S.C. 154(b) by 0 days.

(21) Appl. No.: 09/911,281

(22) Filed: Jul. 23, 2001

Related U.S. Application Data

(63) Continuation-in-part of application No. 09/624,583, filed on Jul. 24, 2000, which is a continuation of application No. 09/118,843, filed on Jul. 20, 1998, now Pat. No. 6,129,528.

(51) Int. Cl.[7] .......................... F04B 17/00; F04B 25/00; F04B 35/00; H05K 7/20
(52) U.S. Cl. ................. 417/423.1; 417/244; 417/423.5; 417/423.7; 361/695; 416/198 R; 416/DIG. 2
(58) Field of Search ............................. 417/244, 423.1, 417/423.5, 423.7; 361/688, 695, 697; 416/198 R, 175, 203, DIG. 2, DIG. 5; 415/199.4

(56) References Cited

U.S. PATENT DOCUMENTS

| | | | |
|---|---|---|---|
| 0,000,588 A | 2/1838 | Ericsson | |
| 1,001,956 A | 8/1911 | Holson | |
| 1,331,997 A | 2/1920 | Neal | |
| 1,856,587 A | 5/1932 | Persons | |
| 1,858,911 A | 5/1932 | Zerbi | |
| 1,985,022 A | 12/1934 | Bothezat | |
| 2,313,413 A | 3/1943 | Weske | |
| 2,609,055 A | 9/1952 | Monroe | |
| 2,811,303 A | 10/1957 | Ault et al. | |
| 2,974,728 A | 3/1961 | Culp | |
| 3,083,893 A | * 4/1963 | Dean | 310/112 |
| 3,096,933 A | * 7/1963 | Bora | 230/235 |
| 3,127,093 A | 3/1964 | Sudrow | |
| 3,168,235 A | 2/1965 | Valdi | |
| 3,169,694 A | 2/1965 | Borchers | |
| 3,574,477 A | 4/1971 | Dolf et al. | |
| 3,867,062 A | 2/1975 | Troller | |

(List continued on next page.)

OTHER PUBLICATIONS

Casey, A Computational Geometry for the Blades and Internal Flow Channels of Central Compressors, ASME 82–GT–155 (undated).
Forrest, Interactive Interpolation and approximation by Bezier polynomials, The Computer Journal, vol. 15, No. 1, p. 71–79 (undated—received by Journal May 1971).
Abbott and Von Doenhoff, Theory of Wing Sections, 1949, p. 111–13.
Selby, Standard Mathematical Tables, 1974, p. 627.
Martensen, The Calculation of the Pressure Distribution on a Cascade of Thick Airfoils by Means of Fredholm Integral Equations of the Second Kind, NASA TT F–702, Jul. 1971.

*Primary Examiner*—Charles G. Freay
*Assistant Examiner*—Timothy P. Solak
(74) *Attorney, Agent, or Firm*—Schulte Roth & Zabel LLP; Joel E. Lutzker; Donna L. Angotti

(57) ABSTRACT

A counter-rotating axial flow fan for cooling electronic components comprising two or more impellers with narrow chord blades. At least one impeller rotates in a first direction and at least one impeller rotates in a second direction opposite to the first direction. The blades of the impellers are configured so as to cause air to flow in the same axial direction. The air flow generated by this counter-rotating fan is substantially greater than the air flow of an otherwise identical co-rotating fan.

18 Claims, 29 Drawing Sheets

U.S. PATENT DOCUMENTS

| | | |
|---|---|---|
| 4,046,489 A | 9/1977 | Fairchild et al. |
| 4,130,770 A | 12/1978 | Wrobel |
| 4,345,161 A | 8/1982 | Crompton |
| 4,360,751 A | 11/1982 | Arnold, Jr. et al. |
| 4,413,796 A | 11/1983 | Bousquet |
| 4,431,376 A | 2/1984 | Lubenstein et al. |
| 4,474,534 A | 10/1984 | Thode |
| 4,569,631 A | 2/1986 | Gray, III |
| 4,579,510 A | 4/1986 | Christensen-Dalsgaard |
| 4,604,032 A * | 8/1986 | Brandt et al. ............... 415/68 |
| 4,830,574 A | 5/1989 | Wainauski et al. |
| 4,840,541 A | 6/1989 | Sakane et al. |
| 4,844,697 A | 7/1989 | Johansen |
| 4,911,612 A | 3/1990 | Rodde et al. |
| 4,941,803 A | 7/1990 | Wainauski et al. |
| 4,971,520 A | 11/1990 | Van Houten |
| 5,054,998 A * | 10/1991 | Davenport ............... 244/110 B |
| 5,109,171 A * | 4/1992 | Schmider ............... 310/180 |
| 5,127,801 A | 7/1992 | Mortensen |
| 5,181,830 A | 1/1993 | Chou |
| 5,244,347 A | 9/1993 | Gallivan et al. |
| 5,273,400 A | 12/1993 | Amr |
| 5,320,493 A | 6/1994 | Shih et al. |
| 5,326,225 A | 7/1994 | Gallivan et al. |
| 5,433,586 A | 7/1995 | Cole |
| 5,513,951 A | 5/1996 | Komoda et al. |
| 5,546,272 A * | 8/1996 | Moss et al. ............... 361/687 |
| 5,616,004 A | 4/1997 | Alizadeh |
| 5,701,045 A | 12/1997 | Yokozawa et al. |
| 5,730,583 A | 3/1998 | Alizadeh |
| 5,755,557 A | 5/1998 | Alizadeh |
| 5,931,640 A | 8/1999 | Van Houten et al. |
| 6,105,206 A | 8/2000 | Tokumaru et al. |
| 6,244,818 B1 | 6/2001 | Chang |

* cited by examiner

A —— NORMAL ROTATION (SINGLE)
B —— REVERSE ROTATION (SINGLE)
C —— SAME ROTATION (TANDEM)
D —— COUNTER-ROTATION (TANDEM)

START OF FLOW SEPARATION

TURBULENT FLOW

SWIRLING FLOW

AXIAL FLOW

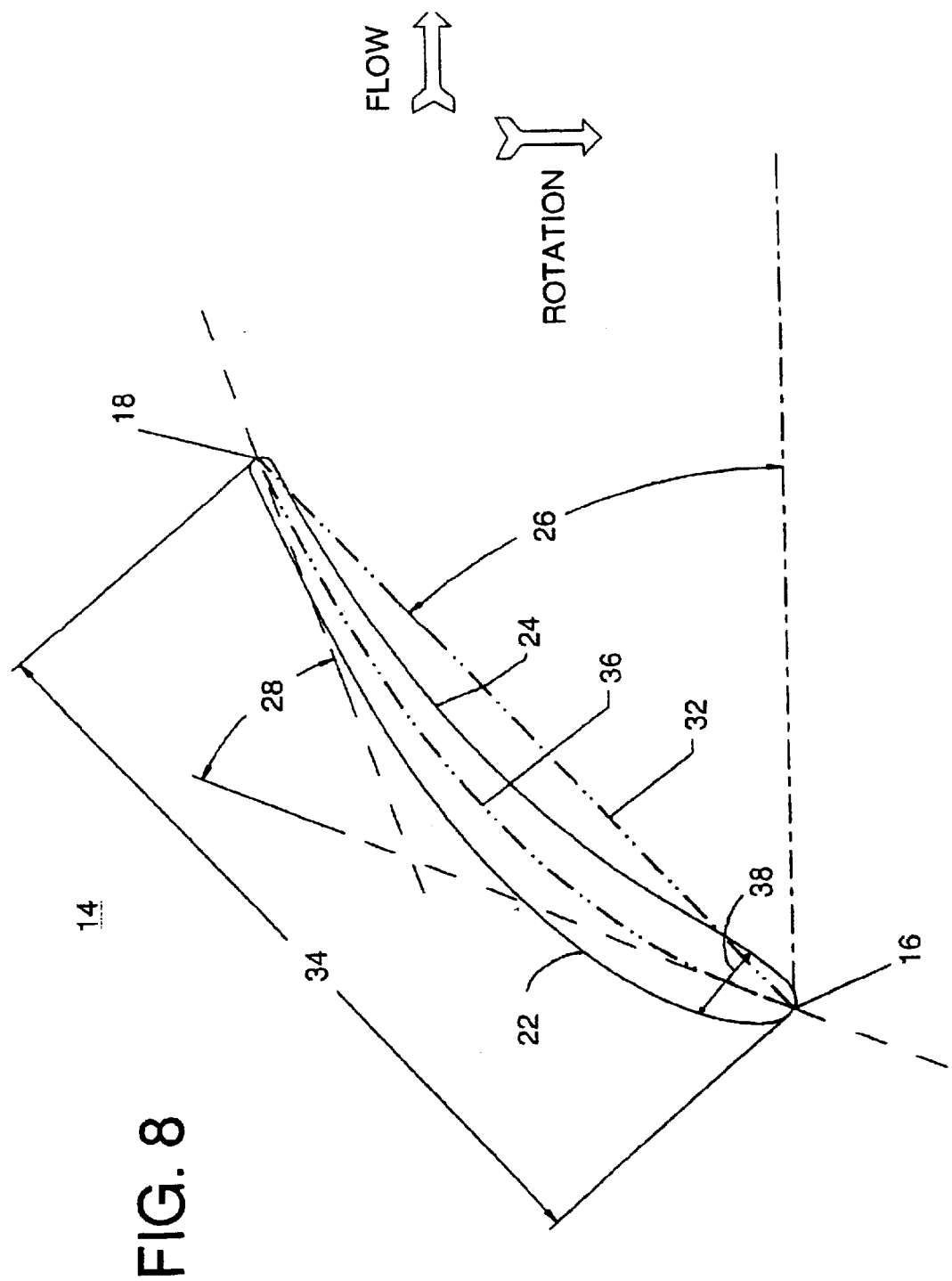

NORMALIZED BEZIER CONTROL POINTS

|   | r/rtip = 0.5009 | | | r/rtip = 0.6459 | | |
|---|---|---|---|---|---|---|
| k | $x_k$ | $y_k$ | $t_k$ | $x_k$ | $y_k$ | $t_k$ |
| 0 | 0.00 | 0.00000 | 3.66090 | 0.00 | 0.00000 | 2.96628 |
| 1 | 1.25 | 0.58007 | 5.24729 | 1.25 | 0.40469 | 4.25167 |
| 2 | 2.50 | 1.16014 | 6.46759 | 2.50 | 0.80938 | 5.24043 |
| 3 | 5.00 | 2.32029 | 8.54210 | 5.00 | 1.61876 | 6.92133 |
| 4 | 7.50 | 3.48043 | 12.08097 | 7.50 | 2.42814 | 9.78873 |
| 5 | 10.00 | 4.64057 | 12.08097 | 10.00 | 3.23751 | 9.78873 |
| 6 | 15.00 | 6.96086 | 12.08097 | 15.00 | 4.85627 | 9.78873 |
| 7 | 20.00 | 9.28114 | 12.08097 | 20.00 | 6.47503 | 9.78873 |
| 8 | 30.00 | 12.34440 | 12.08097 | 30.00 | 9.05043 | 9.78873 |
| 9 | 40.00 | 12.34440 | 10.98270 | 40.00 | 9.05043 | 8.89885 |
| 10 | 50.00 | 13.37310 | 7.80992 | 50.00 | 9.80463 | 6.32807 |
| 11 | 60.00 | 12.34440 | 7.80992 | 60.00 | 9.05043 | 6.32807 |
| 12 | 70.00 | 8.22960 | 5.73541 | 70.00 | 6.03362 | 4.64718 |
| 13 | 80.00 | 6.86226 | 3.66090 | 80.00 | 4.64103 | 2.96628 |
| 14 | 90.00 | 3.48391 | 3.29481 | 90.00 | 2.35621 | 2.66965 |
| 15 | 95.00 | 1.79474 | 3.23379 | 95.00 | 1.21381 | 2.62022 |
| 16 | 97.50 | 0.95015 | 3.14227 | 97.50 | 0.64260 | 2.54606 |
| 17 | 98.75 | 0.52786 | 3.09651 | 98.75 | 0.35700 | 2.50898 |
| 18 | 100.00 | 0.00000 | 3.05075 | 100.00 | 0.00000 | 2.47190 |

FIG.13A

NORMALIZED BEZIER CONTROL POINTS

| | r/rtip = 0.7909 | | | r/rtip = 0.8954 | | |
|---|---|---|---|---|---|---|
| k | $x_k$ | $y_k$ | $t_k$ | $x_k$ | $y_k$ | $t_k$ |
| 0 | 0.00 | 0.00000 | 2.66901 | 0.00 | 0.00000 | 2.71440 |
| 1 | 1.25 | 0.28327 | 3.82559 | 1.25 | 0.24026 | 3.89065 |
| 2 | 2.50 | 0.56654 | 4.71526 | 2.50 | 0.48052 | 4.79545 |
| 3 | 5.00 | 1.13309 | 6.22770 | 5.00 | 0.96103 | 6.33361 |
| 4 | 7.50 | 1.69963 | 8.80774 | 7.50 | 1.44155 | 8.95753 |
| 5 | 10.00 | 2.26618 | 8.80774 | 10.00 | 1.92207 | 8.95753 |
| 6 | 15.00 | 3.39926 | 8.80774 | 15.00 | 2.88310 | 8.95753 |
| 7 | 20.00 | 4.53235 | 8.80774 | 20.00 | 3.84414 | 8.95753 |
| 8 | 30.00 | 6.54998 | 8.80774 | 30.00 | 5.39486 | 8.95753 |
| 9 | 40.00 | 6.54998 | 8.00704 | 40.00 | 5.39486 | 8.14321 |
| 10 | 50.00 | 7.09582 | 5.69389 | 50.00 | 5.84443 | 5.79073 |
| 11 | 60.00 | 6.54998 | 5.69389 | 60.00 | 5.39486 | 5.79073 |
| 12 | 70.00 | 4.36666 | 4.18145 | 70.00 | 3.59657 | 4.25257 |
| 13 | 80.00 | 3.09061 | 2.66901 | 80.00 | 2.53886 | 2.71440 |
| 14 | 90.00 | 1.56908 | 2.40211 | 90.00 | 1.28896 | 2.44296 |
| 15 | 95.00 | 0.80831 | 2.35763 | 95.00 | 0.66401 | 2.39772 |
| 16 | 97.50 | 0.42793 | 2.29090 | 97.50 | 0.35153 | 2.32986 |
| 17 | 98.75 | 0.23774 | 2.25754 | 98.75 | 0.19530 | 2.29593 |
| 18 | 100.00 | 0.00000 | 2.22418 | 100.00 | 0.00000 | 2.26200 |

FIG.13B

| | r/rtip = 1.0000 | | |
|---|---|---|---|
| k | $x_k$ | $y_k$ | $t_k$ |
| 0 | 0.00 | 0.00000 | 3.06144 |
| 1 | 1.25 | 0.23550 | 4.38806 |
| 2 | 2.50 | 0.47100 | 5.40854 |
| 3 | 5.00 | 0.94201 | 7.14336 |
| 4 | 7.50 | 1.41301 | 10.10275 |
| 5 | 10.00 | 1.88402 | 10.10275 |
| 6 | 15.00 | 2.82603 | 10.10275 |
| 7 | 20.00 | 3.76803 | 10.10275 |
| 8 | 30.00 | 4.93440 | 10.10275 |
| 9 | 40.00 | 4.93440 | 9.18432 |
| 10 | 50.00 | 5.34560 | 6.53107 |
| 11 | 60.00 | 4.93440 | 6.53107 |
| 12 | 70.00 | 3.28960 | 4.79626 |
| 13 | 80.00 | 2.47777 | 3.06144 |
| 14 | 90.00 | 1.25795 | 2.75530 |
| 15 | 95.00 | 0.64803 | 2.70427 |
| 16 | 97.50 | 0.34308 | 2.62774 |
| 17 | 98.75 | 0.19060 | 2.58947 |
| 18 | 100.00 | 0.00000 | 2.55120 |

FIG. 13C

| BLADE DEFINITION | ROOT | | | | TIP |
|---|---|---|---|---|---|
| RADIUS (INCHES) | 1.4175 | 1.8278 | 2.2381 | 2.5340 | 2.8300 |
| NORMALIZED RADIUS | 0.5009 | 0.6459 | 0.7908 | 0.8954 | 1.0000 |
| CHORD LENGTH (INCHES) | 0.7785 | 0.9608 | 1.0678 | 1.0499 | 0.9309 |
| NORMALIZED CHORD | 0.8363 | 1.0321 | 1.1471 | 1.1278 | 1.0000 |
| ASPECT RATIO | 1.8144 | 1.4701 | 1.3228 | 1.3454 | 1.5173 |
| SOLIDITY | 1.1363 | 1.0876 | 0.9871 | 0.8573 | 0.6806 |
| STAGGER ANGLE (DEGREES) | 41.831 | 51.330 | 58.685 | 62.607 | 65.653 |
| CAMBER ANGLE (DEGREES) | 47.788 | 33.879 | 23.537 | 19.760 | 19.339 |
| MAXIMUM CAMBER HEIGHT (INCHES) | 0.084 | 0.076 | 0.060 | 0.049 | 0.040 |
| MAXIMUM CAMBER HEIGHT (%CHORD) | 10.823 | 7.863 | 5.652 | 4.671 | 4.320 |
| LOCATION OF MAXIMUM CAMBER (%CHORD) | 45.284 | 45.284 | 45.284 | 45.284 | 45.284 |
| MAXIMUM THICKNESS (INCHES) | 0.089 | 0.089 | 0.089 | 0.089 | 0.089 |
| MAXIMUM THICKNESS (%CHORD) | 11.392 | 9.230 | 8.305 | 8.446 | 9.526 |
| LOCATION OF MAXIMUM THICKNESS (%CHORD) | 19.174 | 19.174 | 19.174 | 19.174 | 19.174 |
| LEADING-EDGE THICKNESS (%CHORD) | 3.661 | 2.966 | 2.669 | 2.714 | 3.062 |
| TRAILING-EDGE THICKNESS (%CHORD) | 3.051 | 2.472 | 2.224 | 2.262 | 2.551 |
| CIRCUMFERENTIAL STACKING DISTANCE (INCHES) | 0.0000 | 0.1335 | 0.2141 | 0.2235 | 0.1806 |
| NORMALIZED CIRCUMFERENTIAL STACKING DISTANCE | 0.0000 | 0.7392 | 1.1855 | 1.2375 | 1.0000 |
| AXIAL STACKING DISTANCE (INCHES) | 0.0000 | -0.0419 | -0.0156 | 0.0216 | 0.0800 |
| NORMALIZED AXIAL STACKING DISTANCE | 0.0000 | -0.5238 | -0.1950 | 0.2700 | 1.0000 |

FIG. 20

NORMALIZED BLADE SURFACE COORDINATES
r/rtip = 0.5009

| # | $X_{UPPER}/C$ | $Y_{UPPER}/C$ | $X_{LOWER}/C$ | $Y_{LOWER}/C$ |
|---|---|---|---|---|
| 1 | 0.00000 | 0.00000 | 0.00000 | 0.00000 |
| 2 | −0.00164 | 0.00733 | 0.00538 | −0.00793 |
| 3 | 0.00112 | 0.02029 | 0.01684 | −0.01404 |
| 4 | 0.00932 | 0.03584 | 0.03360 | −0.01692 |
| 5 | 0.02109 | 0.05019 | 0.05180 | −0.01640 |
| 6 | 0.03931 | 0.06661 | 0.07545 | −0.01370 |
| 7 | 0.06421 | 0.08411 | 0.10315 | −0.00822 |
| 8 | 0.09831 | 0.10227 | 0.13646 | 0.00050 |
| 9 | 0.14433 | 0.12045 | 0.17809 | 0.01242 |
| 10 | 0.20666 | 0.13769 | 0.23280 | 0.02722 |
| 11 | 0.29321 | 0.15170 | 0.30878 | 0.04402 |
| 12 | 0.40785 | 0.15637 | 0.41136 | 0.05873 |
| 13 | 0.48494 | 0.15187 | 0.48213 | 0.06348 |
| 14 | 0.56303 | 0.14173 | 0.55559 | 0.06390 |
| 15 | 0.64006 | 0.12684 | 0.62986 | 0.05993 |
| 16 | 0.71399 | 0.10868 | 0.70267 | 0.05211 |
| 17 | 0.78256 | 0.08915 | 0.77127 | 0.04156 |
| 18 | 0.84321 | 0.07028 | 0.83245 | 0.02976 |
| 19 | 0.89333 | 0.05387 | 0.88311 | 0.01831 |
| 20 | 0.93118 | 0.04111 | 0.92126 | 0.00858 |
| 21 | 0.95695 | 0.03225 | 0.94706 | 0.00135 |
| 22 | 0.97313 | 0.02657 | 0.96313 | −0.00349 |
| 23 | 0.98367 | 0.02280 | 0.97349 | −0.00677 |
| 24 | 0.99251 | 0.01884 | 0.98231 | −0.00908 |
| 25 | 0.99912 | 0.01295 | 0.99065 | −0.00883 |
| 26 | 1.00154 | 0.00617 | 0.99676 | −0.00546 |
| 27 | 1.00000 | 0.00000 | 1.00000 | 0.00000 |

FIG. 21A

NORMALIZED BLADE SURFACE COORDINATES
r/rtip = 0.6459

| # | $X_{UPPER}/C$ | $Y_{UPPER}/C$ | $X_{LOWER}/C$ | $Y_{LOWER}/C$ |
|---|---|---|---|---|
| 1 | 0.00000 | 0.00000 | 0.00000 | 0.00000 |
| 2 | -0.00057 | 0.00593 | 0.00353 | -0.00679 |
| 3 | 0.00305 | 0.01558 | 0.01204 | -0.01235 |
| 4 | 0.01137 | 0.02663 | 0.02502 | -0.01565 |
| 5 | 0.02239 | 0.03650 | 0.03950 | -0.01647 |
| 6 | 0.04094 | 0.04910 | 0.06167 | -0.01599 |
| 7 | 0.06557 | 0.06248 | 0.08862 | -0.01328 |
| 8 | 0.09882 | 0.07623 | 0.12200 | -0.00765 |
| 9 | 0.14379 | 0.08999 | 0.16473 | 0.00103 |
| 10 | 0.20537 | 0.10319 | 0.22185 | 0.01256 |
| 11 | 0.29210 | 0.11407 | 0.30204 | 0.02621 |
| 12 | 0.40847 | 0.11762 | 0.41074 | 0.03848 |
| 13 | 0.48605 | 0.11394 | 0.48434 | 0.04248 |
| 14 | 0.56498 | 0.10580 | 0.56036 | 0.04300 |
| 15 | 0.64310 | 0.09394 | 0.63677 | 0.04002 |
| 16 | 0.71816 | 0.07960 | 0.71120 | 0.03406 |
| 17 | 0.78765 | 0.06441 | 0.78079 | 0.02610 |
| 18 | 0.84872 | 0.05007 | 0.84229 | 0.01738 |
| 19 | 0.89859 | 0.03800 | 0.89258 | 0.00916 |
| 20 | 0.93558 | 0.02899 | 0.92982 | 0.00240 |
| 21 | 0.96021 | 0.02299 | 0.95452 | -0.00245 |
| 22 | 0.97534 | 0.01928 | 0.96961 | -0.00560 |
| 23 | 0.98497 | 0.01688 | 0.97912 | -0.00767 |
| 24 | 0.99235 | 0.01445 | 0.98650 | -0.00886 |
| 25 | 0.99813 | 0.01031 | 0.99327 | -0.00797 |
| 26 | 1.00065 | 0.00511 | 0.99791 | -0.00470 |
| 27 | 1.00000 | 0.00000 | 1.00000 | 0.00000 |

FIG. 21B

NORMALIZED BLADE SURFACE COORDINATES
r/rtip = 0.7908

| # | $X_{UPPER}/C$ | $Y_{UPPER}/C$ | $X_{LOWER}/C$ | $Y_{LOWER}/C$ |
|---|---|---|---|---|
| 1 | 0.00000 | 0.00000 | 0.00000 | 0.00000 |
| 2 | -0.00002 | 0.00532 | 0.00261 | -0.00633 |
| 3 | 0.00405 | 0.01350 | 0.00976 | -0.01180 |
| 4 | 0.01246 | 0.02246 | 0.02106 | -0.01554 |
| 5 | 0.02316 | 0.03013 | 0.03388 | -0.01720 |
| 6 | 0.04207 | 0.04036 | 0.05523 | -0.01835 |
| 7 | 0.06677 | 0.05104 | 0.08164 | -0.01775 |
| 8 | 0.09972 | 0.06171 | 0.11492 | -0.01464 |
| 9 | 0.14420 | 0.07212 | 0.15811 | -0.00877 |
| 10 | 0.20533 | 0.08191 | 0.21639 | -0.00027 |
| 11 | 0.29193 | 0.08973 | 0.29865 | 0.01036 |
| 12 | 0.40884 | 0.09169 | 0.41037 | 0.02047 |
| 13 | 0.48655 | 0.08831 | 0.48539 | 0.02408 |
| 14 | 0.56581 | 0.08151 | 0.56268 | 0.02509 |
| 15 | 0.64440 | 0.07187 | 0.64012 | 0.02345 |
| 16 | 0.71997 | 0.06045 | 0.71531 | 0.01955 |
| 17 | 0.78988 | 0.04857 | 0.78535 | 0.01415 |
| 18 | 0.85113 | 0.03762 | 0.84695 | 0.00821 |
| 19 | 0.90087 | 0.02868 | 0.89702 | 0.00265 |
| 20 | 0.93743 | 0.02222 | 0.93380 | -0.00185 |
| 21 | 0.96150 | 0.01808 | 0.95797 | -0.00502 |
| 22 | 0.97614 | 0.01559 | 0.97261 | -0.00705 |
| 23 | 0.98535 | 0.01402 | 0.98176 | -0.00836 |
| 24 | 0.99210 | 0.01236 | 0.98851 | -0.00894 |
| 25 | 0.99754 | 0.00909 | 0.99456 | -0.00766 |
| 26 | 1.00018 | 0.00463 | 0.99850 | -0.00438 |
| 27 | 1.00000 | 0.00000 | 1.00000 | 0.00000 |

FIG. 21C

NORMALIZED BLADE SURFACE COORDINATES
r/rtip = 0.8954

| # | $X_{UPPER}/C$ | $Y_{UPPER}/C$ | $X_{LOWER}/C$ | $Y_{LOWER}/C$ |
|---|---|---|---|---|
| 1 | 0.00000 | 0.00000 | 0.00000 | 0.00000 |
| 2 | 0.00015 | 0.00543 | 0.00245 | −0.00654 |
| 3 | 0.00456 | 0.01368 | 0.00954 | −0.01240 |
| 4 | 0.01340 | 0.02259 | 0.02092 | −0.01665 |
| 5 | 0.02452 | 0.03007 | 0.03391 | −0.01884 |
| 6 | 0.04367 | 0.03972 | 0.05514 | −0.02078 |
| 7 | 0.06861 | 0.04958 | 0.08145 | −0.02110 |
| 8 | 0.10173 | 0.05913 | 0.11469 | −0.01911 |
| 9 | 0.14620 | 0.06809 | 0.15790 | −0.01461 |
| 10 | 0.20706 | 0.07612 | 0.21624 | −0.00770 |
| 11 | 0.29306 | 0.08204 | 0.29855 | 0.00125 |
| 12 | 0.40901 | 0.08262 | 0.41020 | 0.01019 |
| 13 | 0.48630 | 0.07908 | 0.48527 | 0.01374 |
| 14 | 0.56519 | 0.07269 | 0.56254 | 0.01525 |
| 15 | 0.64350 | 0.06399 | 0.63990 | 0.01463 |
| 16 | 0.71889 | 0.05388 | 0.71497 | 0.01213 |
| 17 | 0.78871 | 0.04349 | 0.78489 | 0.00831 |
| 18 | 0.84996 | 0.03399 | 0.84643 | 0.00391 |
| 19 | 0.89976 | 0.02628 | 0.89652 | −0.00033 |
| 20 | 0.93644 | 0.02076 | 0.93340 | −0.00384 |
| 21 | 0.96066 | 0.01724 | 0.95769 | −0.00637 |
| 22 | 0.97541 | 0.01513 | 0.97245 | −0.00799 |
| 23 | 0.98470 | 0.01380 | 0.98169 | −0.00906 |
| 24 | 0.99160 | 0.01232 | 0.98859 | −0.00945 |
| 25 | 0.99722 | 0.00916 | 0.99472 | −0.00796 |
| 26 | 1.00003 | 0.00471 | 0.99862 | −0.00450 |
| 27 | 1.00000 | 0.00000 | 1.00000 | 0.00000 |

FIG. 21D

NORMALIZED BLADE SURFACE COORDINATES
r/rtip = 1.0000

| # | X$_{UPPER}$/C | Y$_{UPPER}$/C | X$_{LOWER}$/C | Y$_{LOWER}$/C |
|---|---|---|---|---|
| 1 | 0.00000 | 0.00000 | 0.00000 | 0.00000 |
| 2 | 0.00018 | 0.00621 | 0.00274 | −0.00746 |
| 3 | 0.00514 | 0.01586 | 0.01079 | −0.01447 |
| 4 | 0.01507 | 0.02637 | 0.02371 | −0.01981 |
| 5 | 0.02757 | 0.03517 | 0.03844 | −0.02274 |
| 6 | 0.04710 | 0.04531 | 0.06005 | −0.02523 |
| 7 | 0.07255 | 0.05535 | 0.08658 | −0.02599 |
| 8 | 0.10619 | 0.06474 | 0.11987 | −0.02446 |
| 9 | 0.15092 | 0.07313 | 0.16285 | −0.02056 |
| 10 | 0.21140 | 0.08015 | 0.22046 | −0.01444 |
| 11 | 0.29594 | 0.08465 | 0.30118 | −0.00635 |
| 12 | 0.40909 | 0.08385 | 0.41012 | 0.00215 |
| 13 | 0.48526 | 0.07979 | 0.48413 | 0.00598 |
| 14 | 0.56302 | 0.07320 | 0.56031 | 0.00815 |
| 15 | 0.64027 | 0.06461 | 0.63663 | 0.00852 |
| 16 | 0.71478 | 0.05481 | 0.71079 | 0.00722 |
| 17 | 0.78401 | 0.04481 | 0.78008 | 0.00461 |
| 18 | 0.84506 | 0.03563 | 0.84138 | 0.00125 |
| 19 | 0.89512 | 0.02811 | 0.89170 | −0.00226 |
| 20 | 0.93243 | 0.02263 | 0.92917 | −0.00536 |
| 21 | 0.95741 | 0.01907 | 0.95420 | −0.00771 |
| 22 | 0.97283 | 0.01690 | 0.96961 | −0.00928 |
| 23 | 0.98268 | 0.01552 | 0.97940 | −0.01035 |
| 24 | 0.99047 | 0.01387 | 0.98718 | −0.01073 |
| 25 | 0.99682 | 0.01033 | 0.99408 | −0.00901 |
| 26 | 1.00001 | 0.00531 | 0.99847 | −0.00508 |
| 27 | 1.00000 | 0.00000 | 1.00000 | 0.00000 |

FIG. 21E

AXIAL FLOW FAN HAVING COUNTER-ROTATING DUAL IMPELLER BLADE ARRANGEMENT

This application is a continuation-in-part of U.S. application Ser. No. 09/624,583 filed on Jul. 24, 2000, which is a continuation of U.S. Pat. No. 09/118,843 now U.S. Pat. No. 6,129,528 filed on Jul. 20, 1998.

FIELD OF THE INVENTION

The present invention relates to an axial flow fan, and more particularly to a multiple impeller arrangement with coaxial impellers that rotate in opposite directions. The multiple impeller counter-rotating axial flow fan of the present invention is especially suitable for use in cooling electronic components.

BACKGROUND OF THE INVENTION

A conventional axial flow fan is generally composed of a driving motor, a cylindrical central hub section mounted on a motor shaft attached to the driving motor, a plurality of blades affixed to the hub, and a housing for encasing the fan or impeller, used herein as equivalent terms. Each of the blades extends radially outward from the central hub section of the fan. The motor shaft is attached to the hub section at a central aperture and thus the hub section may be rotated by the driving motor via the motor shaft. In such an arrangement, the hub section together with the blades are rotated by the motor about an axis of the outer casing in order to force air flow from an inlet area to an outlet area of the fan. The blades of the fan are air foils configured so as to make the blades generate a force in the opposite direction of the blade's direction of rotation and an air flow that is perpendicular to the blade's direction of rotation.

Axial flow fans such as Model No. 5920 produced by IMC Magnetics Corporation, the assignee of the present application, are known which utilize a unipolar winding employing a four pole motor where only two of the windings are ON at a time. These fans employ circuitry including circuit elements of a substantial size, such as an inductor to reduce the starting current, transistors large enough to handle the power levels, and large clamping diodes needed to protect the transistors. Such axial flow fans cannot handle input voltages in the range of 57V–64V, are limited to a maximum input voltage of about 56V, and are more typically operated at an input voltage of about 48V.

Model No. 5920 measures two inches in axial width due to both the large size of the diodes, inductors, and transistors used, as well as the number of turns required for a unipolar winding. Furthermore, the axial width of Model No. 5920 is attributed to its 5 blades wherein each blade is characterized by a symmetrical cross-section approximately described as curved flat plates. As such, these blades are not aerodynamically efficient and thus require a larger chord length to meet the performance requirements forcing the dimensions of Model No. 5920 to a two inch axial width.

With the continual increase in the density and load-carrying capability of electronic components on circuit boards, and the consequential increase in heating problems resulting therefrom, axial flow fans are increasingly being used in an effort to combat such heating problems. During the design of such axial flow fans, it is important to make them as small and as cost-effective as possible while maintaining, or even increasing, their ability to cool electronic components. In particular, it is important to reduce the overall size of such a fan as much as possible. For example, the two inches axial width of Model No. 5920 is wider than optimal for use as an axial flow fan for cooling electronic components. Thus, it is desirable to reduce its size while maintaining its performance parameters and design constraints.

One method to reduce the overall size of such a fan is to eliminate large electronic components and reduce the size of other components while maintaining performance parameters and design constraints. For instance, the housing of the axial flow fan may be utilized as a heat sink to reduce the axial width of the fan by eliminating the need for a separate heat sink.

In addition, in order to reduce the overall size of an axial flow fan, it is desirable to utilize narrow chord blades. However, the use of such narrow chord blades results in decreased performance, particularly a decrease in the fan pressure and air flow. These decreases in performance must be offset by varying the design parameters. It is known that, among other factors, the chord length, camber angle, stagger angle, and the cross-sectional shape of the blades are possible factors affecting the performance of the fan. In addition, it is known that by varying the work distribution along a blade's span, the chord length may be varied along the blade span while maintaining performance parameters.

In theory, the larger the camber angle, the greater the lift force under a constant angle of attack. However, if the camber angle is too large the blade may stall, resulting in a decrease in performance and an increase in noise signature. Consequently, the camber angle must be designed to the proper value.

By way of a further example, a decrease in the work distribution at a radial location will allow for a decrease in chord length with a resultant decrease in velocity exiting the blade at that radial location. Thus, it is desirable to minimize the work distribution at the hub section (root of the blade), since this affects axial width, and to maximize the work distribution at the tip of the blade to deliver the greatest blade exit velocity at the tip. Such an approach was disclosed in U.S. Pat. No. 5,320,493. However, this approach may lead to an intolerable increase in the noise signature of the fan due to the increase in tip velocity exiting the blade as well as an increase in turbulent air exiting the tip of the blades. Thus, it is desirable to locate the maximum work distribution at some favorable location between the root portion and the tip portion.

Furthermore, the cross-sectional shape of the blade affects its velocity distribution. Circular arc profiles, such as NACA series 65 airfoils, exhibit a velocity profile which results in a rapid decrease in the velocity along the suction surface at the trailing edge of the blade. Such a large deceleration gradient results in a more unstable boundary layer, promoting boundary layer separation and hence resulting in loss of lift and greater turbulent air exiting the blade. Thus, the velocity profile of the cross-sectional airfoil must be designed so that a favorable velocity profile is achieved.

Various prior U.S. patents had been developed in this field. For example, U.S. Pat. No. 4,971,520, U.S. Pat. No. 4,569,631, U.S. Pat. No. 5,244,347, U.S. Pat. No. 5,326,225, U.S. Pat. No. 5,513,951, U.S. Pat. No. 5,320,493, U.S. Pat. No. 5,181,830, U.S. Pat. No. 5,273,400, U.S. Pat. No. 2,811,303, and U.S. Pat. No. 5,730,483 disclose axial flow fans. However, the fans disclosed in these patents have not effectively combined the above parameters to overcome the problems described above. In particular no invention discloses a family of airfoil profiles or a blade which delivers the performance of the present invention while reducing the axial width of the fan. Nor does any invention disclose use of such optimized blades in a multiple impeller counter-rotating arrangement to further exploit the reduced width of each impeller individually and to result in a fan having reduced overall size with improved performance.

In the non-analogous field of aircraft rotors, the use of multiple coaxial rotors, as shown in U.S. Pat. No. 3,127,093 to Sudrow, is known. The Sudrow Patent discloses a "Ducted Sustaining Rotor for Aircraft" which utilizes two sets of coaxial rotors, each of which has a plurality of air foils configured to create lift. These rotors are mounted on motor shafts which are capable of spinning in opposite directions. Such counter-rotating arrangements have been utilized to reduce torque, to reduce axial air flow and to reduce vibration and noise.

Unlike the air foils attached to aircraft rotors, the air foils attached to fan rotors are configured to create air flow. Conventional theory predicts that two identical axial flow fans operating in series in a free flow environment, where there is not substantial downstream flow resistance, will not provide more air flow than one of the axial flow fans operating by itself. Conventional theory also predicts that two identical axial flow fans operating in series in a flow restricted environment, where there is substantial downstream flow resistance, will provide at most twice the air flow of a single fan operating by itself, where the maximum increase is only approached as down stream flow resistance becomes very large. Conventional theory further predicts that placing two otherwise identical axial flow fans in a counter-rotating arrangement, by inverting the rotor of one such fan and rotating said rotor in the opposite direction of the other fan's rotor, will provide the same amount of air flow as the fans would provide in a co-rotating arrangement. Since using two fans doubles the cost and power requirements of using a single fan, convention theory does not support the use of relatively complicated and bulky counter-rotating arrangements.

U.S. Pat. No. 2,313,413 to Weske discloses an axial flow fan that uses multiple co-rotating impellers with interspersed fixed blades. U.S. Pat. No. 5,931,640 to Van Houten et al. discloses using two counter-rotating fans with oppositely skewed blades for use as vehicle engine cooling fan. These patents disclose that such arrangements allow the fans to develop the required air flows while operating at slower speeds. These patents also teach that the disclosed arrangements reduce parasitic loses and provide improved acoustic properties.

SUMMARY OF THE INVENTION

No invention in the prior art discloses a multi-impeller, coaxial, counter-rotating fan that provides increases in airflow compared to a single impeller fan beyond what is predicted by conventional theory. No invention in the prior art discloses a counter-rotating fan that provides more than twice the air flow into a pressurized environment as a co-rotating fan. No invention in the prior art discloses a combination of the factors to formulate a blade which delivers the desired performance while reducing the overall size to that of the present invention. In addition, no invention in the prior art discloses the use of such optimized blades in making dual impeller, coaxial, counter-rotating fan.

Through experimentation, it has been shown that a fan with counter-rotating impellers employing the improved blade design described herein will provide increases in air-flow as compared to a fan with a single impeller that are substantially greater than the increases predicted by conventional theory. In addition, it has been shown that a fan with counter-rotating impellers employing the improved blade design described herein will provide more than twice the air flow into a pressurized environment as an otherwise identical fan with co-rotating impellers. Accordingly, it is an object of this invention to provide a multiple impeller axial flow fan in which the impellers are substantially coaxial and counter-rotating, with substantially improved performance parameters.

It is an additional object of the invention to provide a blade incorporating a family of airfoil sections capable of reducing the axial width of an axial flow fan while maintaining performance parameters and design constraints.

It is yet another object of the invention to provide a blade incorporating a family of airfoil sections which allow for the reduction of the axial width of an axial fan while locating the maximum work distribution between the root portion and the tip portion of the blade.

It is yet another object of the invention to provide a blade incorporating a family of airfoil sections that allow for the reduction of the overall size of an axial fan while maintaining a favorable velocity profile over the suction side of the blade.

It is yet another object of the invention to provide a counter-rotating impeller arrangement that provides an increase in axial air flow which is substantially greater than that predicted using theoretical models.

It is yet another object of the invention to provide a counter-rotating impeller arrangement that provides more than twice the air flow into a pressurized environment as an otherwise identical co-rotating impeller arrangement.

It is yet another object of the invention to exploit the reduction of width of the axial fans by utilizing same to make a multiple, counter-rotating impeller arrangement which provides an increase in axial air flow feasible given certain design constraints of electric fans for use in cooling electronic components.

These and other objects are realized by an axial flow fan structure that includes at least two coaxial rotor assemblies, where each of the rotor assemblies further includes an impeller with a plurality of blades; and where at least one of said rotor assemblies is configured such that it rotates in a direction opposite to the first of said rotor assemblies; and where the blades on each of the rotor assemblies are configured such each impeller forces air in the same axial direction as the other impellers.

These and other objects are further realized by providing said impellers with blades having the following characteristics: a root portion; a tip portion; a leading edge; a trailing edge; the blade having a cross-sectional shape, taken anywhere along a radius of the blade, characterized by a maximum thickness located substantially constantly between about 19% chord to about 20% chord and a maximum camber located substantially constantly between about 45% chord to about 46% chord.

It has been experimentally determined that the acoustic properties of a dual impeller counter-rotating fan can be improved by having a different number of blades on the upstream impeller than are on the downstream impeller. In a preferred embodiment, the upstream impeller consists of thirteen radially extending blades coupled to a circular band and the downstream impeller consists of eleven circumferentially spaced radially extending blades coupled to a circular band.

It has further been determined that air flow is optimized when said multiple counter-rotating impellers are located in a conically shaped hosing. The diameter of the second impeller may be greater than the diameter of the first impeller.

These and other objects, features, and advantages of the present invention will become more apparent in light of the following detailed description and accompanying drawings.

BRIEF DESCRIPTION OF THE DRAWINGS

The present invention will be more easily understood with reference to the following drawings.

FIG. 8 is a cross-sectional view of a blade in accordance with the present invention;

FIGS. 13A–C are tabular representations of the optimized normalized Bezier control points for the five airfoil sections of the preferred embodiment in accordance with the present invention;

FIG. 20 is a tabular representation of the optimized values describing the five airfoil sections of the preferred embodiment in accordance with the present invention; and FIGS. 21A–E are tabular representations of the normalized surface coordinates of the preferred embodiment in accordance with the present invention.

DETAILED DESCRIPTION OF THE PREFERRED EMBODIMENT

General Structure of the Axial Flow Fan

Figure 1:
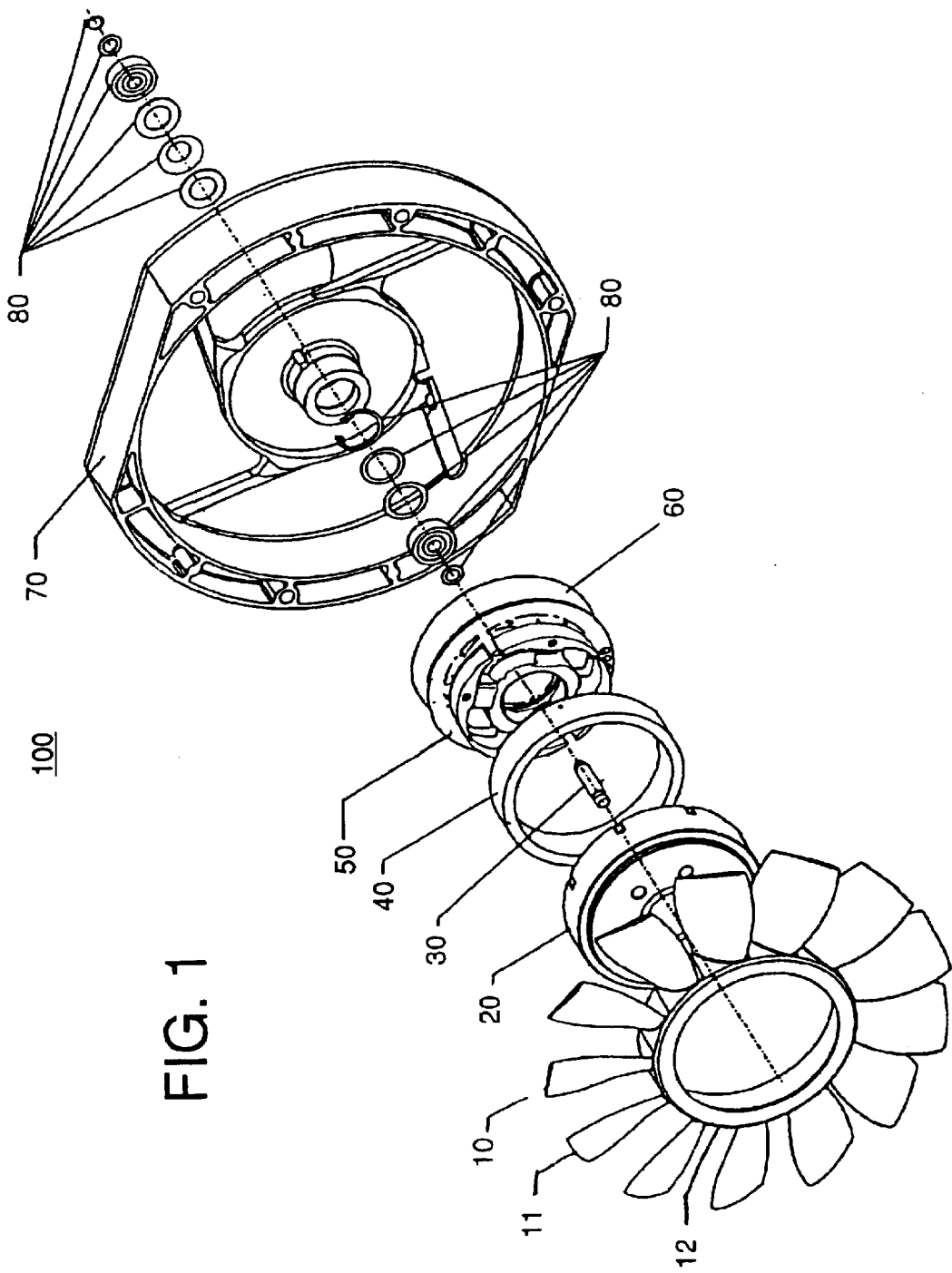
FIG. 1 is an exploded perspective view of a single impeller axial flow fan.
Figure 2:
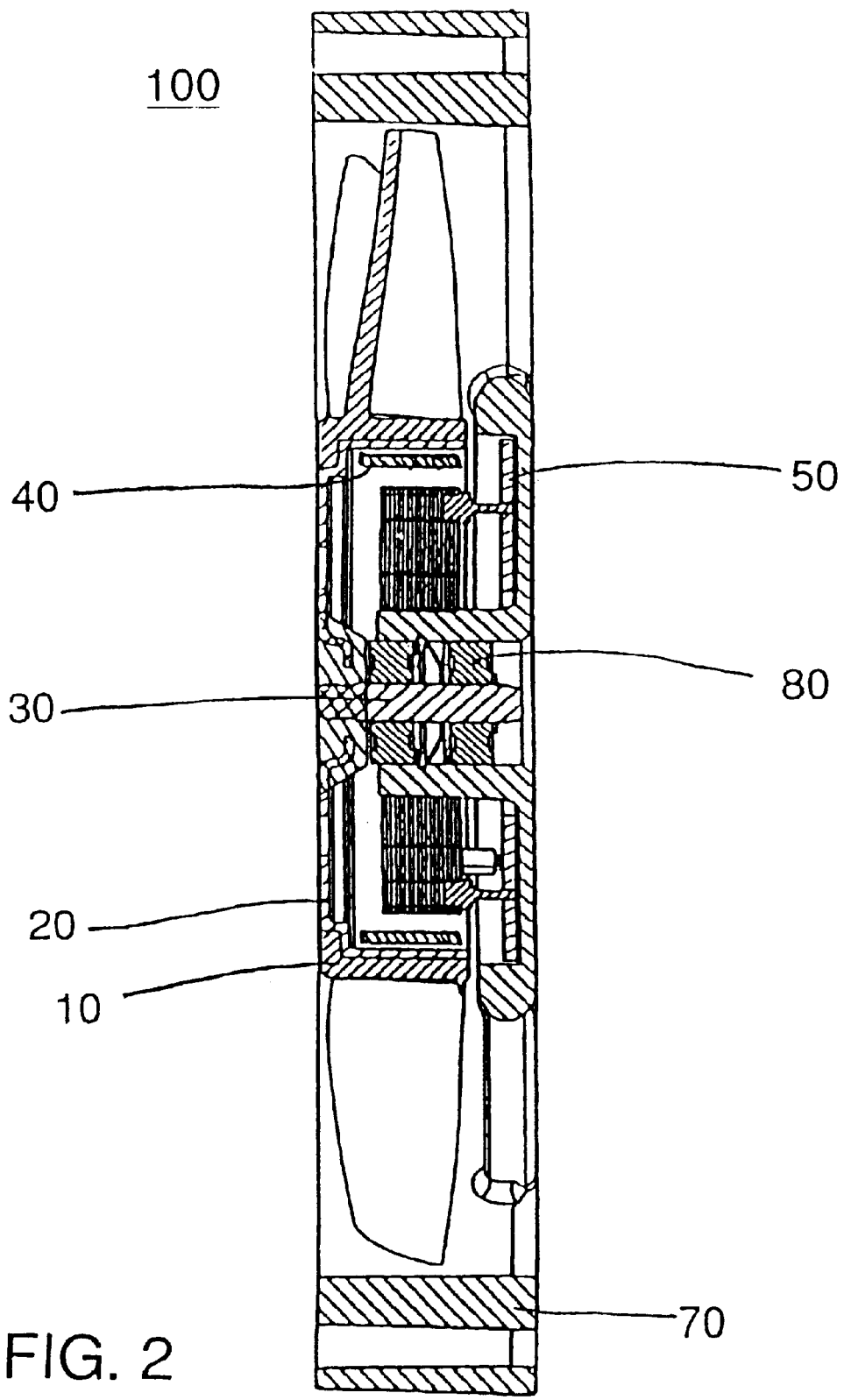
FIG. 2 is a cross-sectional assembled view thereof.

A description of a preferred embodiment of the present invention will now be given. Referring now to the drawings, and in particular to FIGS. 1 and 2, wherein illustrated is an axial flow fan 100, comprising an impeller 10, for generating air flow when rotated, a yoke mounted in impeller 10, a shaft 30 coupled to yoke 20, a permanent magnet 40 mounted in yoke 20, a stator assembly 50, a fan housing 70, an insulation sheet 60 for electrically insulating the base within stator assembly 50 from fan housing 70, and bearings and mounting hardware 80 which serve to secure the shaft 30 to housing 70 while allowing yoke and magnet 40 to freely rotate, thereby rotating impeller 10. The impeller 10 comprises a plurality of blades 11 equally spaced and circumferentially mounted on circular band 12. The permanent magnet 40 mounted in yoke 20, when combined with stator assembly 50, forms an electrical motor which turns impeller 10 when a voltage is applied to an exciting circuit on the printed circuit board within stator assembly 50. The construction of stator assembly 50 is fully described in co-pending and co-owned patent application No. 09/119,221 entitled "Stator Mounting Method and Apparatus for a Motor," which was filed on Jul. 20, 1998, and which is incorporated herein by reference.

Figure 7A:
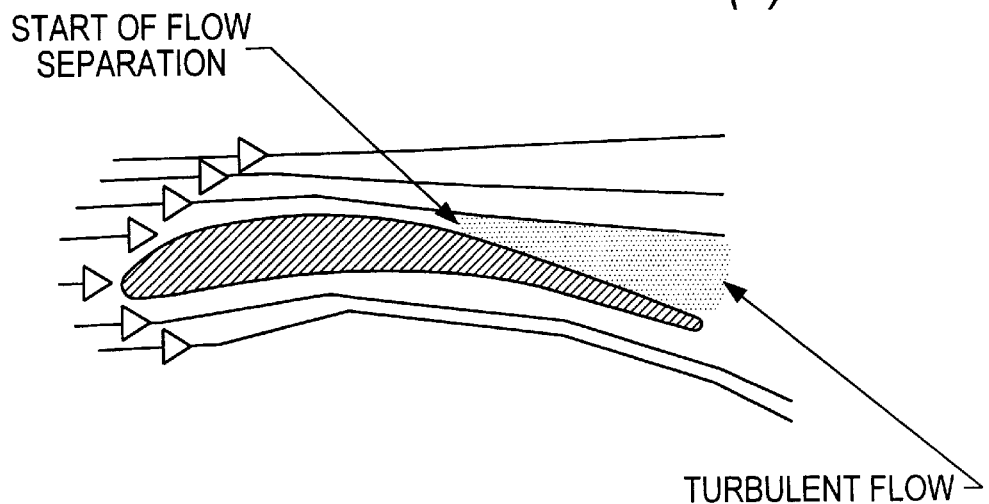
FIG. 7(a) is a cross-sectional view of a standard impeller blade showing the flow of air over the surfaces of the blade caused by the blade motion resulting from rotating the impeller.
Figure 7B:
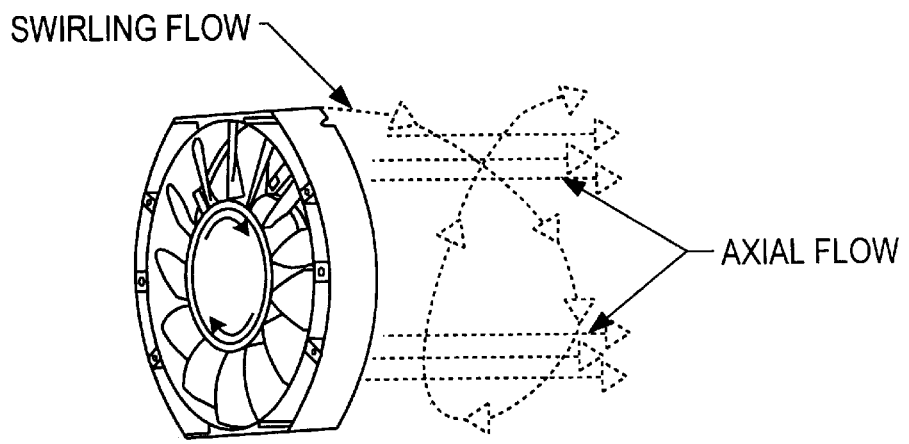
FIG. 7(b) is a three-dimensional view of a single impeller axial flow fan showing the axial flow of air output by the fan as well as the radial (swirling) air flow created by rotating the impeller.
Figure 7C:
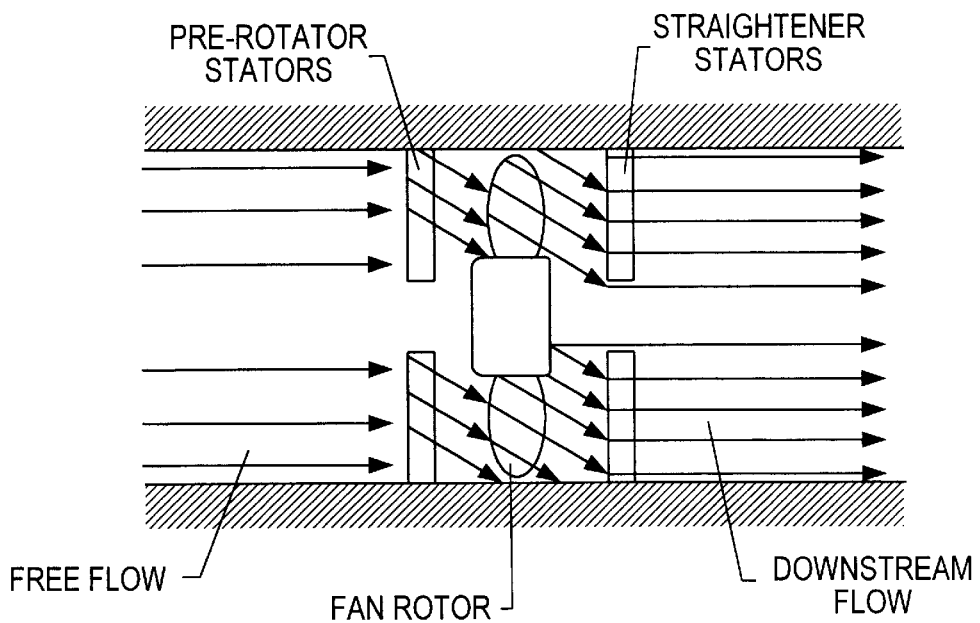
FIG. 7(c) is an idealized cross-sectional view of a single impeller axial flow fan employing stator assemblies to remove the radial component of the downstream air flow.
Figure 7D:
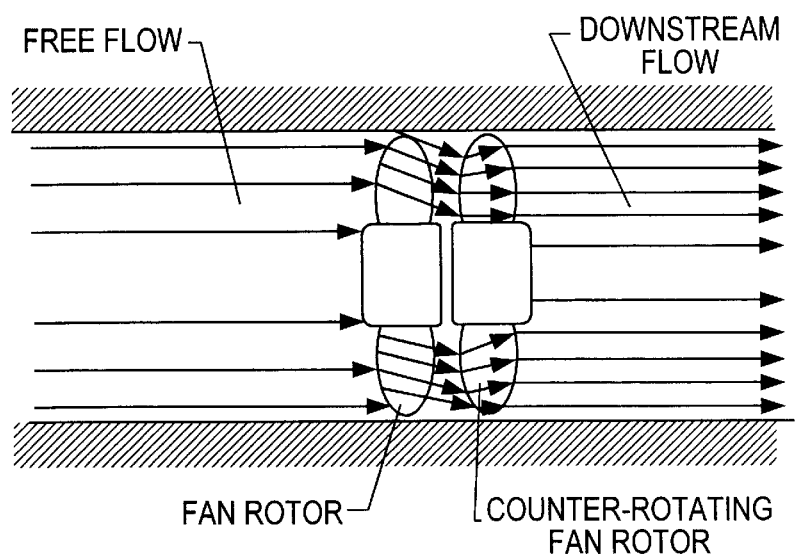
FIG. 7(d) is an idealized cross-sectional view of a two impeller counter rotating axial flow fan embodying the present invention, wherein the radial air flow imparted by the first impeller is removed by the second impeller.

As shown in FIG. 7(d), the counter rotating fan of the preferred embodiment is comprised of a first single impeller axial flow fan as described in the preceding paragraph and a second single impeller axial flow fan contained within a single housing. The input of the second single impeller axial flow fan is connected to the output of the first single impeller axial flow fan. In addition, the second single impeller axial flow fan has an impeller that rotates in the reverse direction compared to the direction of rotation of the impeller contained in the first single impeller axial flow fan and the second single impeller axial flow fan has blades that are oppositely pitched as compared to the blades of the first single impeller axial flow fan.

Figure 7E:
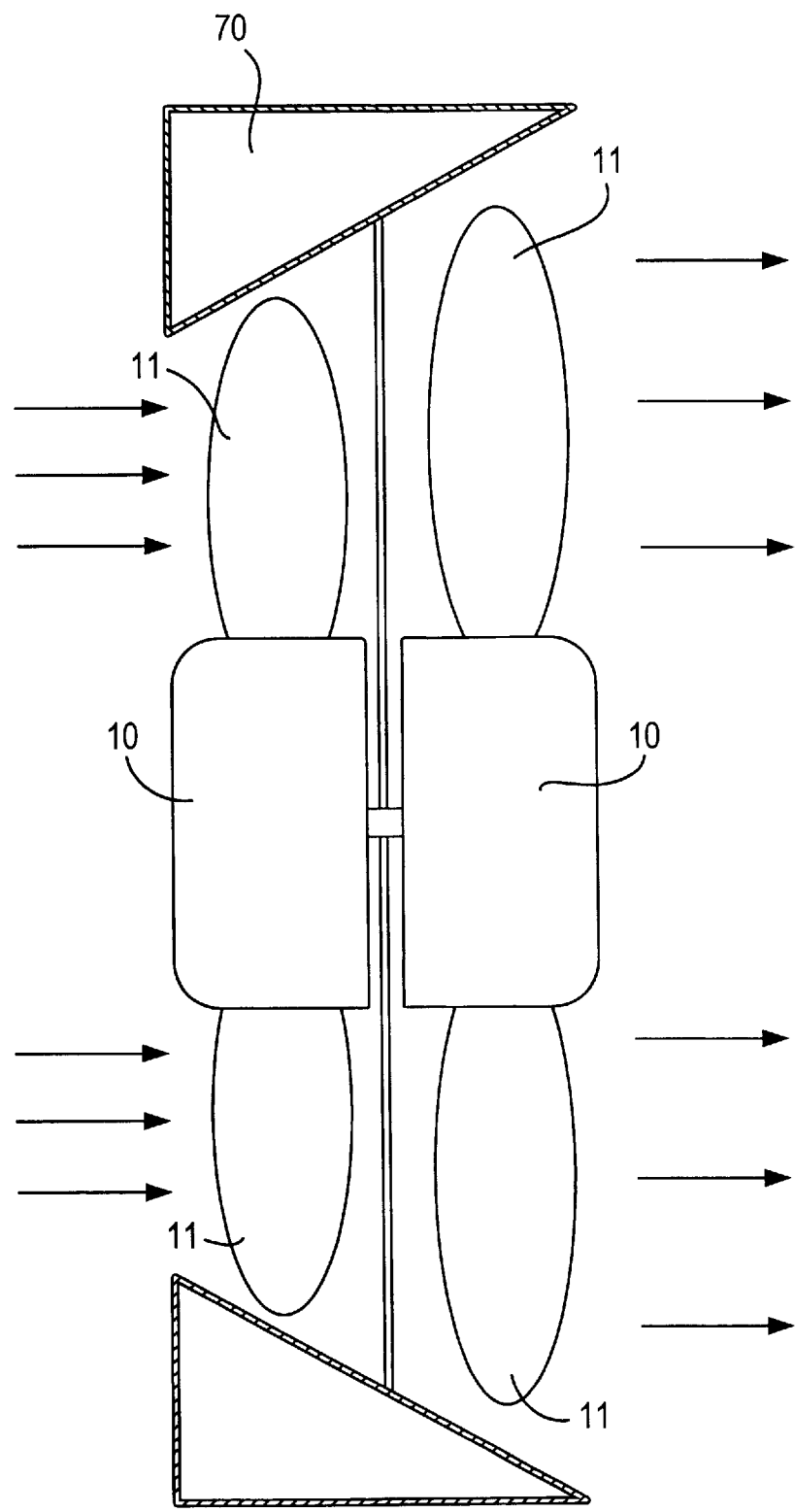
FIG. 7(e) is an idealized cross-sectional view of a two impeller counter rotating axial flow fan having a conically shaped hosing.

In the preferred embodiment, the first impeller has thirteen blades and the second impeller has eleven blades. In addition, the second impeller can be made slightly larger than the first impeller (i.e. with a longer diameter) and the common housing can be in the shape of a cone with a diameter that expands from the input of the first impeller to the output of the second impeller as shown in FIG. 7(e).

Figure 3:
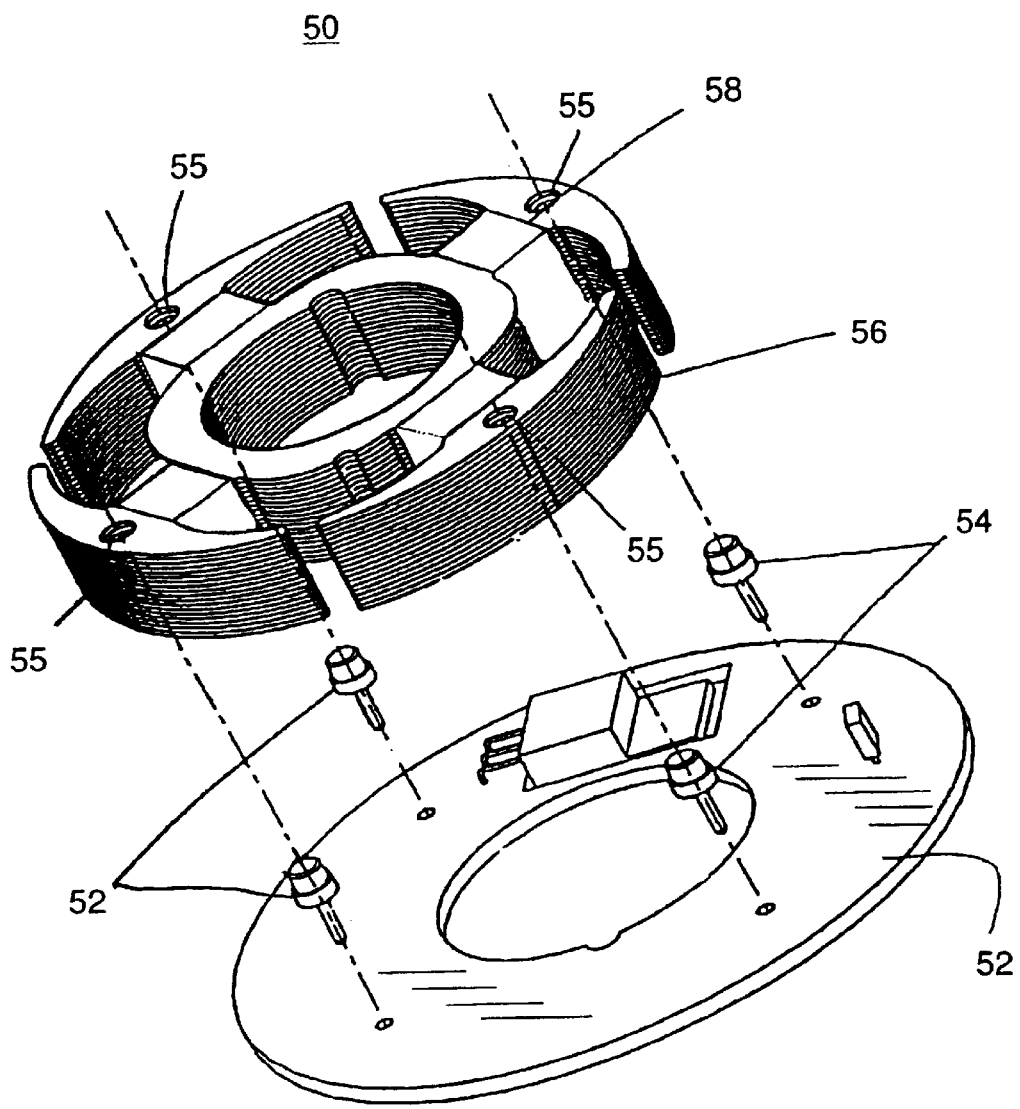
FIG. 3 is an exploded perspective view of the stator assembly.

FIG. 3 depicts the stator assembly 50, comprising a base 52, four insulating pins 54, a stator core 56 and windings 58. In the preferred embodiment, base 52 is a printed circuit board including the circuitry for exciting and operating the motor.

Figure 4:
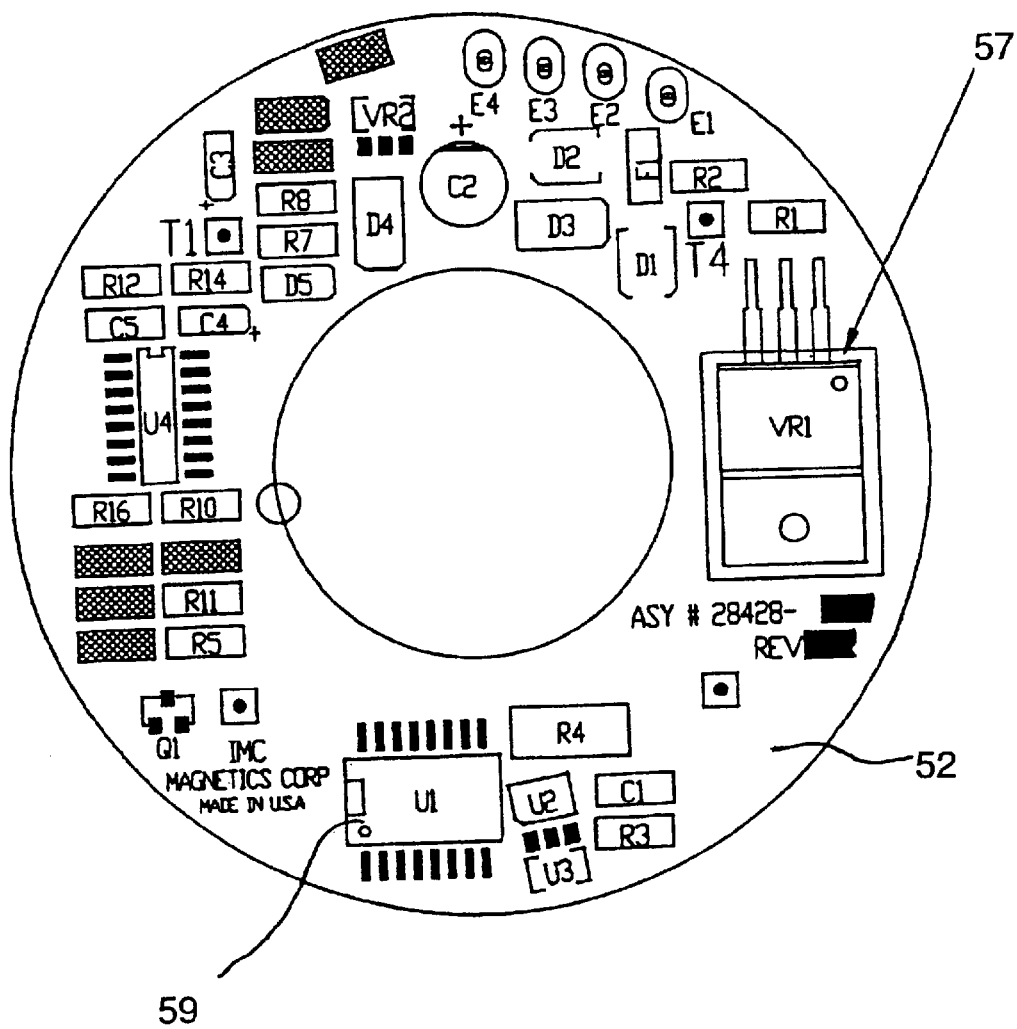
FIG. 4 is a top view of the printed circuit board base 52.
Figure 5:
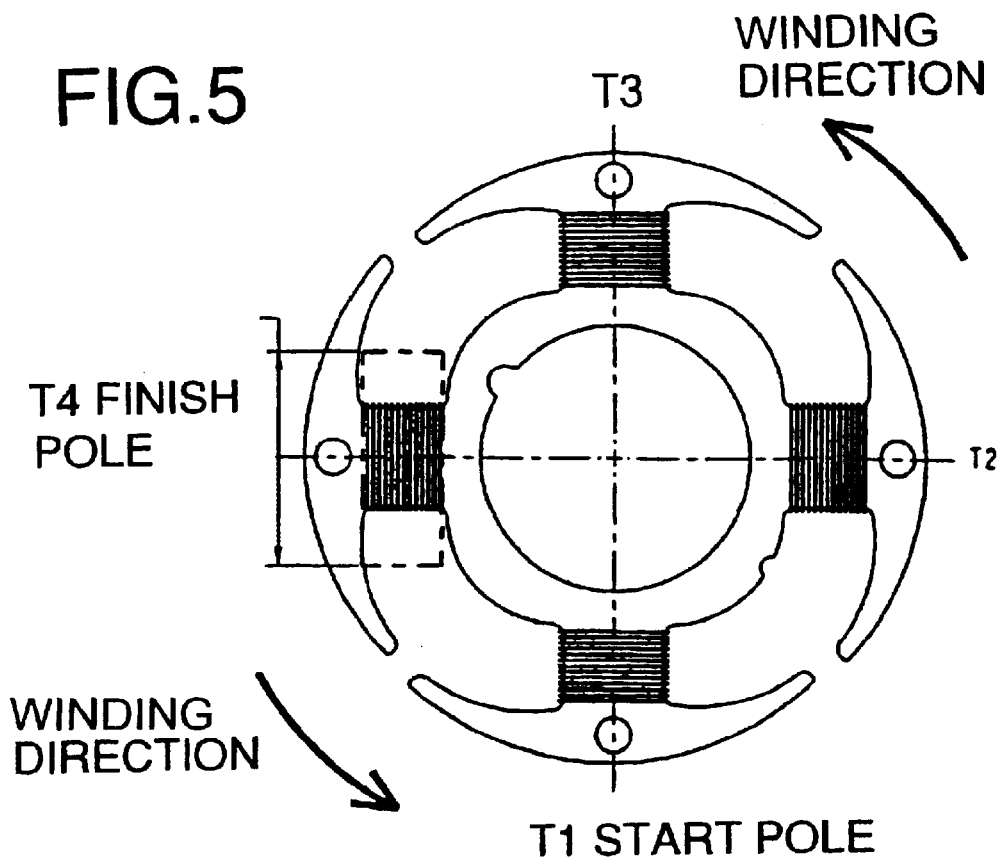
FIG. 5 is a top view of the stator core and winding.

The base 52 as shown in FIG. 4 is a printed circuit board which has mounted thereon the circuitry for operating the motor. The voltage regulator 57 permits use of an input voltage in the range of about 28V to 64V, a greater range than in other fans such as the Model No. 5920 fan mentioned in the section above entitled "Background of the Invention". The input and output voltages of the voltage regulator are different. The voltage regulator adjusts the voltage at the output to be appropriate for the IC circuitry on the output side of the voltage regulator. Delivering low voltages at the output of the voltage regulator to all resistors, transistors, diodes, and capacitors permits the use of small components reducing the size of the circuitry so that it may be employed in a fan of a reduced width. In the preferred embodiment there is no need for the large clamping diodes such as Part No. V03C manufactured by Hitachi employed in the Model No. 5920 axial flow fan. Four large transistors such as Part Nos. 25B 1203-5 manufactured by Sanyo employed in the circuitry of the Model No. 5920 fan in order to handle the heat and power of the high voltage levels are eliminated in the invention. The preferred embodiment employs transistor switches in the ICs 61 and 62 which operate on the reduced voltage level of the output of the voltage regulator. Further, the inductor Part No. 6308-R8151 manufactured by Minebea in the Model No. 5920 axial fan is eliminated in the invention. Accordingly, the finished circuit board of the preferred embodiment is of reduced width when compared to earlier circuit boards such as the circuit board for the Model No. 5920. Further, an axial flow fan with reduced width is achieved.

The preferred embodiment eliminates the need for large circuit components including clamping diodes and transistors by employing a voltage regulator 57. The use of the voltage regulator to step down the input voltage generates heat across the voltage regulator which must be dissipated. The housing 70 of the fan functions as a heat sink. Use of the housing 70 as the heat sink eliminates the need for a resistor of significant size for use as the heat sink for the voltage regulator. Since the housing 70 functions as a heat sink as well as an enclosure, a standard heat compound which is a heat sinking thermo-conductive adhesive such as Loctite® Thermally-Conductive Adhesive 3873 is used to transfer the heat from the voltage regulator 57 to the metal housing 70. Alternatively, or additionally, a pin may be used to secure the voltage regulator IC 57 to the housing. The pin functions to temporarily secure the voltage regulator during the curing of the heat compound. Accordingly, a fan of reduced width is achieved.

In practice, when combined with the blade design discussed below, a single impeller axial flow fan having a one inch thickness and having the same air flow output as the Model 5920 IMC Magnetic Corp. axial flow fan (which is two inches thick) is achieved by implementing the above described improvements and a two impeller counter rotating axial flow fan having a two inch thickness and having the improved air flow characteristics of the present invention is achieved by implementing the above described improvements.

Parameters of the Blade Structure

FIG. 8 is a cross-sectional view of one of the blades 11 of the preferred embodiment of the present invention and it depicts the parameters which define, in part, the cross-sectional shape 14 of the blades 11 of the present invention. Each cross-section has a leading edge 16, trailing edge 18, upper surface 22, and lower surface 24. The cross-section may be further defined by the stagger angle 26, camber angle 28, chord line 32, chord length 34, camber line 36, and thickness (t) 38.

Figures 9A, 9B:
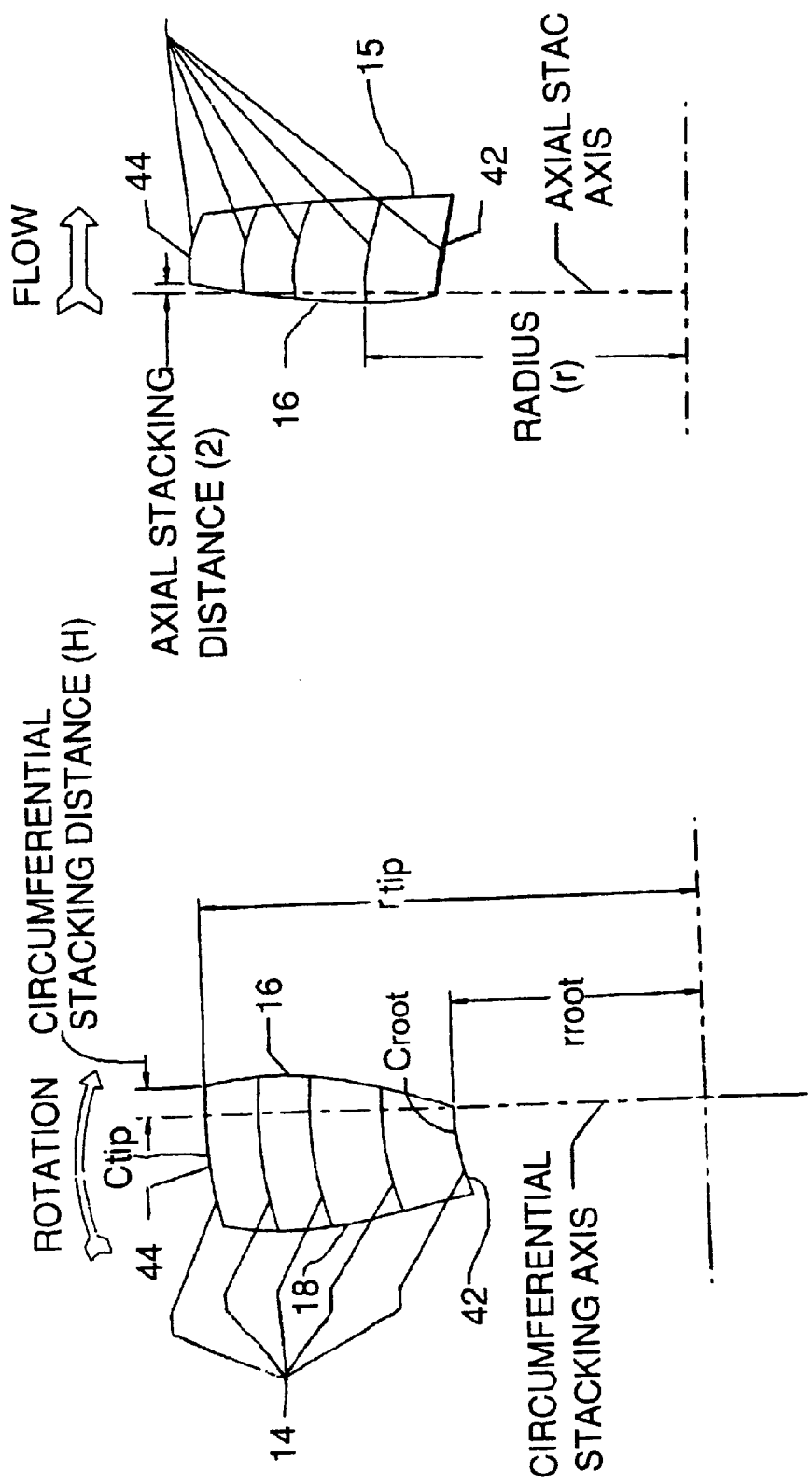
FIG. 9A is a frontal view of a blade in accordance with the present invention.
FIG. 9B is a side view of a blade in accordance with the present invention.

Referring now to FIGS. 9A and 9B, blades 11 of the preferred embodiment are constructed by radially and axially stacking and blending the cross-sections 14 in order to form a three-dimensional blade. FIG. 9A is a frontal view of blades 11 while FIG. 9B is a side view of blades 11. Thus, the view of FIG. 9B is a rotated 90 degrees from the view of FIG. 9A. The blade has a root portion 42 and a tip portion 44. The root portion 42 is coterminous with the circumference of circular band 12 (FIG. 1). Each airfoil section 14 of blade 11 is identified with respect to the radius which originates from the center of circular band 12 and extends radially outward as depicted in FIG. 9B. The location of each airfoil section 14 is defined by $r/r_{tip}$ which is the ratio of the radial location of the particular cross-section 14 (r) divided by the radius of the airfoil section at the tip portion 14 ($r_{tip}$) in FIGS. 9A and 9B as shown.

Figure 10:
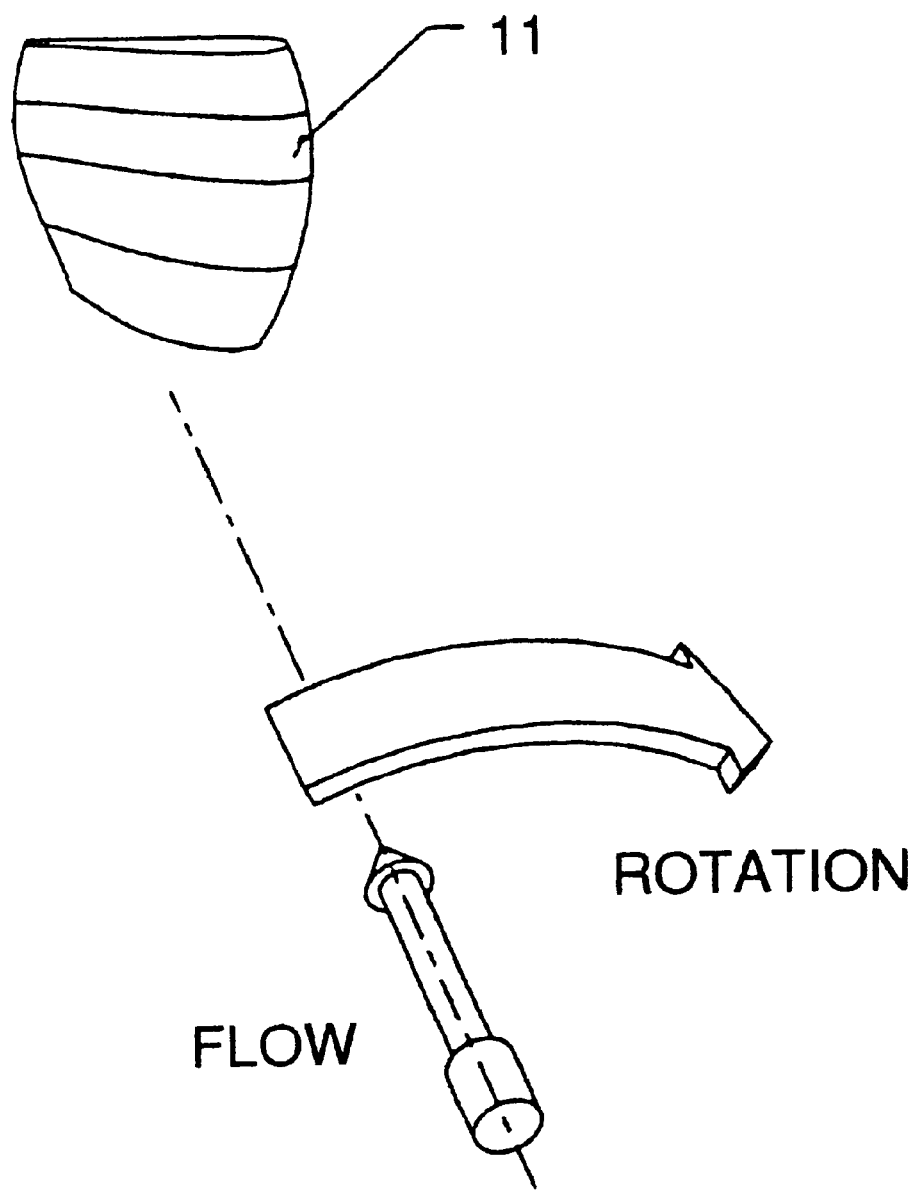
FIG. 10 is a three-dimensional view of a blade in accordance with the present invention.
Figure 11:
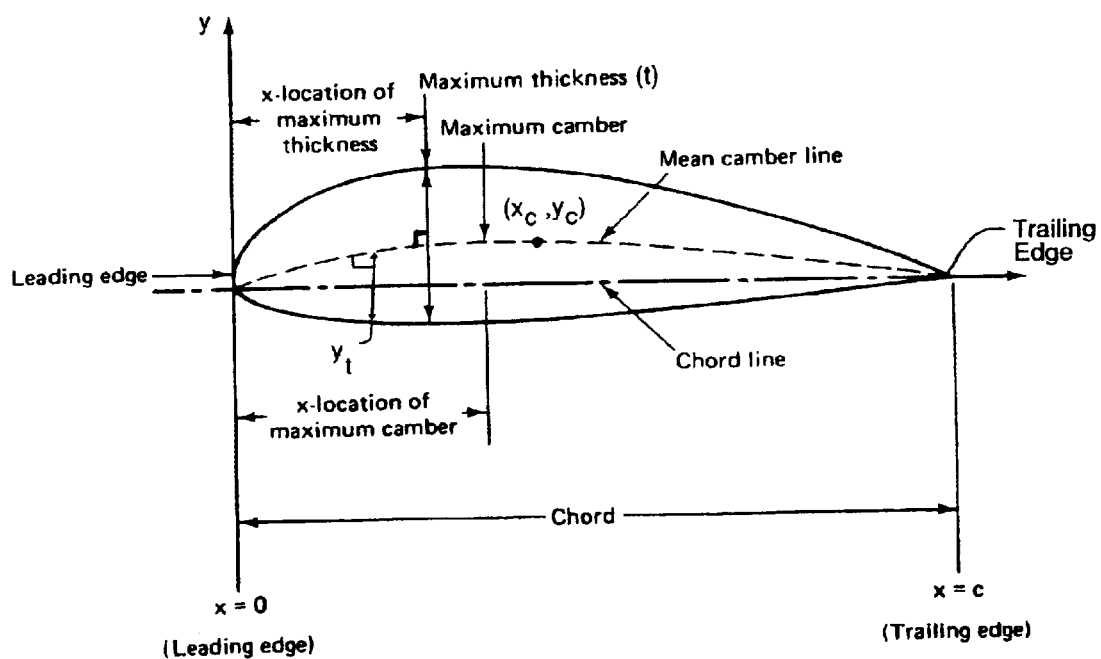
FIG. 11 is a definitional diagram of the coordinate system utilized in the description of the blades employed by the present invention.

The Circumferential Stacking axis is defined by an axis that intersects the leading edge 16 of cross-section 14 located at the root portion 42 and extends in the circumferential direction. Circumferential Stacking distance is defined by the distance between the leading edge 16 of an airfoil cross-section 14 and the Circumferential Stacking axis. The Axial Stacking axis is defined by an axis that intersects the leading edge 16 of the cross-section 14 located at the root portion 42 and extends in the axial direction. Axial Stacking distance is defined by the distance between the leading edge 16 of an airfoil cross-section 14 and the Axial Stacking axis. Once the cross sections 14 are stacked, a three-dimensional blade 11 results as depicted in FIG. 10. FIG. 11 is a definitional diagram showing a cross-section of a randomly chosen blade which presents the coordinate axes used to define blades 11 and cross-sectional shapes 14 of the present invention.

The blades of the present invention were designed according to the following method. A series of fan performance parameters and design constraints to be satisfied by the single impeller axial flow fan 100 and accompanying blades 11 were set. Fan performance parameters include volumetric flow rate at the free air condition defined in cubic feet per minute (ft$^3$/min), shaft speed (rpm), and inlet air density in pounds per cubic feet (lbs/ft$^3$). Design constraints include fan size (including axial width), fan weight, motor input power, and acoustic noise signature. These performance parameters and design constraints were set as: volumetric flow rate of 240 ft³/min, shaft speed of 3400 rpm, and inlet air density of 0.075 lbs/ft³, and axial width fan size of 1 inch. Although these are the optimum requirements, satisfactory results may be obtained for a volumetric flow rate of 225 to 255 ft³/min and a shaft speed of 3200 to 3600 rpm. Among these parameters and constraints the most important are the volumetric flow rate and axial width fan size.

For the aerodynamic design, a multi-streamline, indirect method was used to determine the optimum values of chord length 34, camber angle 28, and stagger angle 26 which are capable of delivering the specified fan performance parameters and satisfying the stated design constraints. Based on experience, the desired work distribution was selected. Work distribution is defined as the angular momentum distribution of the air flow at the outlet of the impeller 10 (trailing edge 18 of cross-section 14). The work distribution affects the size of the chord length 34. Finally, based on experience, the number of impeller blades were selected to optimize the flow output and fan width.

The next step was to determine the camber line and thickness distributions. These distributions were determined through use of Bezier curves, an example of such use is referenced in Casey, "A Computational Geometry for the Blades and Internal Flow Channels of Centrifugal Compressors", ASME 82-GT-155. This method determines the distributions in camber line and thickness in the following parametric form:

$$F(u) = \sum_{k=0}^{k=n} f_k B_k^n(u)$$

wherein:
  F(u) represents the solution of the Bezier curve which, in this instance is separately applied to determine the camber line x and y coordinates
  $B_k^n(u) = \binom{n}{k} u^k (1-u)^{n-k}$ as well as the thickness distribution;
  u is a parameter that varies linearly between 0 and 1, (u=0 at the leading edge 16 and u=1 at the trailing edge 18);
  $f_k$ is a one-dimensional array of Bezier control points;
  $B_k^n(u)$ is the Bernstein polynomial of degree n;
  n+1 is the number of Bezier control points; and
  $\binom{n}{k}$ are the binomial coefficients as defined in CRC Standard Mathematical Tables, 22nd Ed., 1974, p. 627.

n was chosen to be 18 so that the resultant Bezier equations were an 18th degree polynomial which resulted in 19 control points. Such a selection affords much more precision in optimizing the cross-sectional shapes 14 of the blades 11 than a lower order polynomial. The resulting equations for the Bezier curves are:

$$X_c(u) = A_0(1-u)^{18}x_0 + A_1u(1-u)^{17}x_1 + A_2u^2(1-u)^{16}x_2 +$$
$$A_3u^3(1-u)^{15}x_3 + A_4u^4(1-u)^{14}x_4 + A_5u^5(1-u)^{13}x_5 +$$
$$A_6u^6(1-u)^{12}x_6 + A_7u^7(1-u)^{11}x_7 + A_8u^8(1-u)^{10}x_8 +$$
$$A_9u^9(1-u)^9 x_9 + A_{10}u^{10}(1-u)^8 x_{10} + A_{11}u^{11}(1-u)^7 x_{11} +$$
$$A_{12}u^{12}(1-u)^6 x_{12} + A_{13}u^{13}(1-u)^5 x_{13} + A_{14}u^{14}(1-u)^4 x_{14} +$$
$$A_{15}u^{15}(1-u)^3 x_{15} + A_{16}u^{16}(1-u)^2 x_{16} + A_{17}u^{17}(1-u)x_{17} + A_{18}u^{18}x_{18}$$

-continued
$$Y_c(u) = A_0(1-u)^{18}y_0 + A_1u(1-u)^{17}y_1 + A_2u^2(1-u)^{16}y_2 +$$
$$A_3u^3(1-u)^{15}y_3 + A_4u^4(1-u)^{14}y_4 + A_5u^5(1-u)^{13}y_5 +$$
$$A_6u^6(1-u)^{12}y_6 + A_7u^7(1-u)^{11}y_7 + A_8u^8(1-u)^{10}y_8 +$$
$$A_9u^9(1-u)^9 y_9 + A_{10}u^{10}(1-u)^8 y_{10} + A_{11}u^{11}(1-u)^7 y_{11} +$$
$$A_{12}u^{12}(1-u)^6 y_{12} + A_{13}u^{13}(1-u)^5 y_{13} + A_{14}u^{14}(1-u)^4 y_{14} +$$
$$A_{15}u^{15}(1-u)^3 y_{15} + A_{16}u^{16}(1-u)^2 y_{16} + A_{17}u^{17}(1-u)y_{17} + A_{18}u^{18}y_{18}$$

$$T_n(u) = A_0(1-u)^{18}t_0 + A_1u(1-u)^{17}t_1 + A_2u^2(1-u)^{16}t_2 +$$
$$A_3u^3(1-u)^{15}t_3 + A_4u^4(1-u)^{14}t_4 + A_5u^5(1-u)^{13}t_5 +$$
$$A_6u^6(1-u)^{12}t_6 + A_7u^7(1-u)^{11}t_7 + A_8u^8(1-u)^{10}t_8 +$$
$$A_9u^9(1-u)^9 t_9 + A_{10}u^{10}(1-u)^8 t_{10} + A_{11}u^{11}(1-u)^7 t_{11} +$$
$$A_{12}u^{12}(1-u)^6 t_{12} + A_{13}u^{13}(1-u)^5 t_{13} + A_{14}u^{14}(1-u)^4 t_{14} +$$
$$A_{15}u^{15}(1-u)^3 t_{15} + A_{16}u^{16}(1-u)^2 t_{16} + A_{17}u^{17}(1-u)t_{17} + A_{18}u^{18}t_{18}$$

Wherein:
  $X_c$ is the x coordinate of the camber line normalized by the chord length,
  $Y_c$ is the y coordinate of the camber line normalized by the chord length,
  $T_n$ is the thickness distribution normalized by the chord length,
  $A_0$ to $A_{18}$ are the Bernstein Polynomial Coefficients according to the following values:

$A_0 = 1$
$A_1 = 18$
$A_2 = 153$
$A_3 = 816$
$A_4 = 3060$
$A_5 = 8568$
$A_6 = 18564$
$A_7 = 31824$
$A_8 = 43758$
$A_9 = 48620$
$A_{10} = 43758$
$A_{11} = 31824$
$A_{12} = 18564$
$A_{13} = 8568$
$A_{14} = 3060$
$A_{15} = 816$
$A_{16} = 153$
$A_{17} = 18$
$A_{18} = 1$ and
  $x_0$ to $x_{18}$ (hereinafter referred to as "$x_k$") are the normalized x coordinates of the Bezier control points;
  $y_0$ to $y_{18}$ (hereinafter referred to as "$y_k$") are the normalized y coordinates of the Bezier control points; and
  $t_0$ to $t_{18}$ (hereinafter referred to as "$t_k$") are the normalized thickness control points.

Based on experience, initial values of the Bezier control points $x_k$, $y_k$, and $t_k$ were selected. With these control points, the above equations were solved for camber and thickness distributions.

Once the distributions along with the optimum chord length 34, camber angle 28, and stagger angle 26 were determined, an inviscid flow analysis was utilized to determine the surface velocity distribution on the suction (upper) side and the pressure (lower) side along with the work distribution of blade 11. The velocity distribution and resulting work distribution were viewed by the designer to verify that the work distribution profile is consistent with the initial design selection and also to assure that a favorable velocity profile had been achieved.

Figure 12:
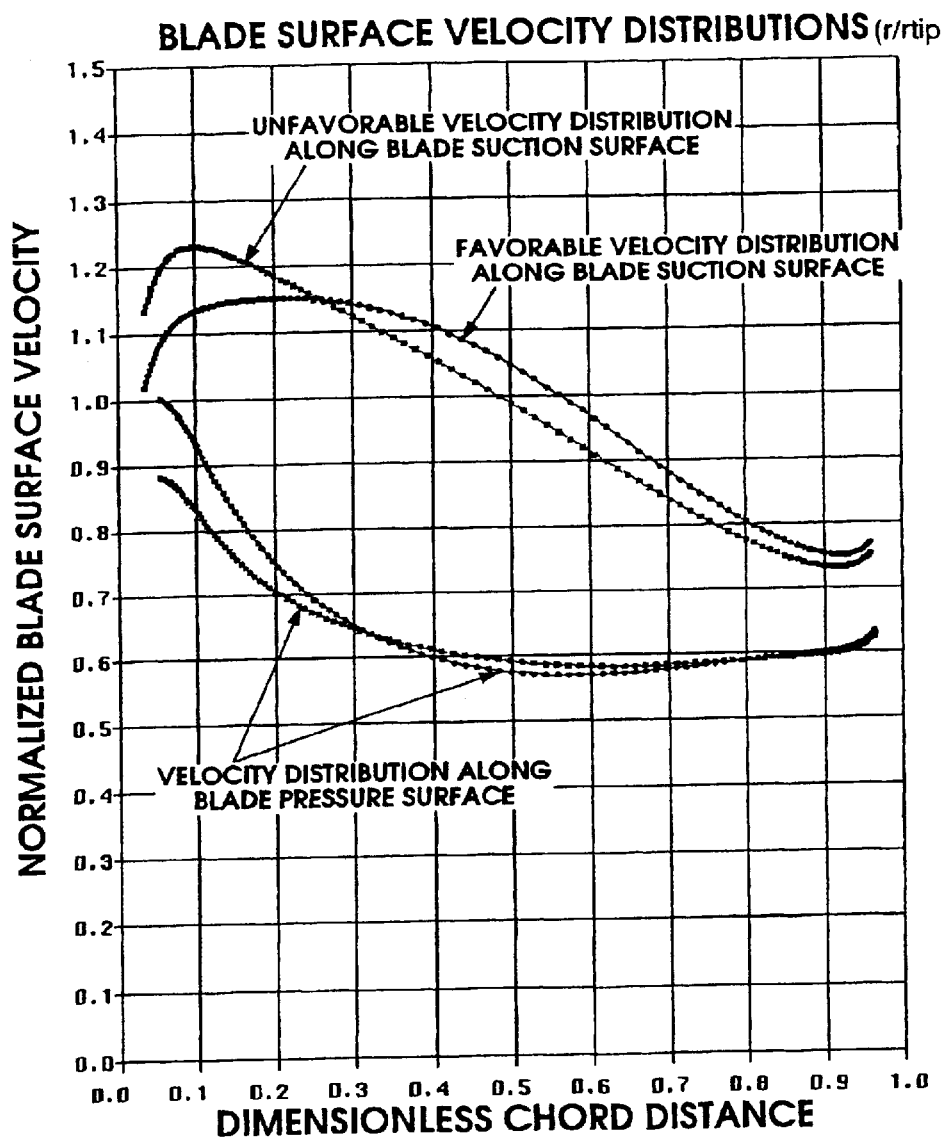
FIG. 12 is a comparison of a graphical representation of a favorable blade surface velocity distribution near design conditions in accordance with the present invention as compared to an unfavorable blade surface velocity distribution.

A typical desirable blade surface velocity distribution is sought that exhibits favorable deceleration gradients, favorable in the sense that the velocity distribution does not promote boundary layer separation and thereby weaken blade 11 performance. FIG. 12 is a comparison of a graphical representation of a favorable blade surface velocity distribution near design conditions in accordance with the present invention (at $r/r_{tip}=0.6459$) as compared to an unfavorable blade surface velocity distribution. A favorable work distribution is one that locates the maximum work distribution at a point somewhere between the root portion and the tip portion.

After the initial iteration, since the resultant velocity distribution and work distribution were unfavorable or unsatisfactory to the designer, the Bezier control points were manually varied in order to achieve different camber and thickness distributions. Once again, the velocity and work distributions were analyzed to determine if a favorable solution had been achieved. This process was repeated until a favorable solution was achieved. In the preferred embodiment, the optimized normalized Bezier control points are shown in tabular form in FIGS. 13A–C.

Figure 14:
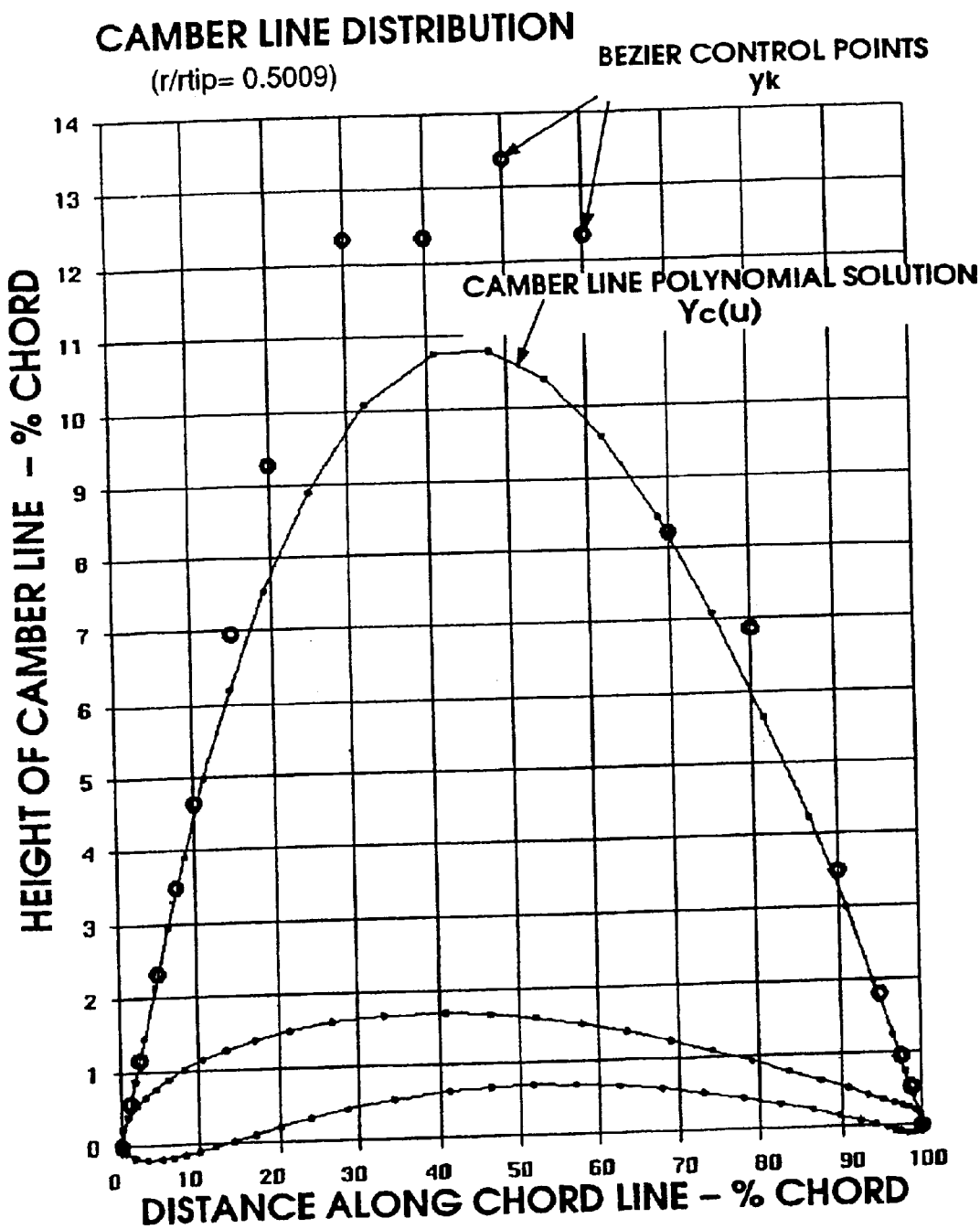
FIG. 14 is a graphical representation of the camber line distribution at the root portion of the preferred embodiment in accordance with the present invention along with the associated optimized normalized Bezier control points.
Figure 15:
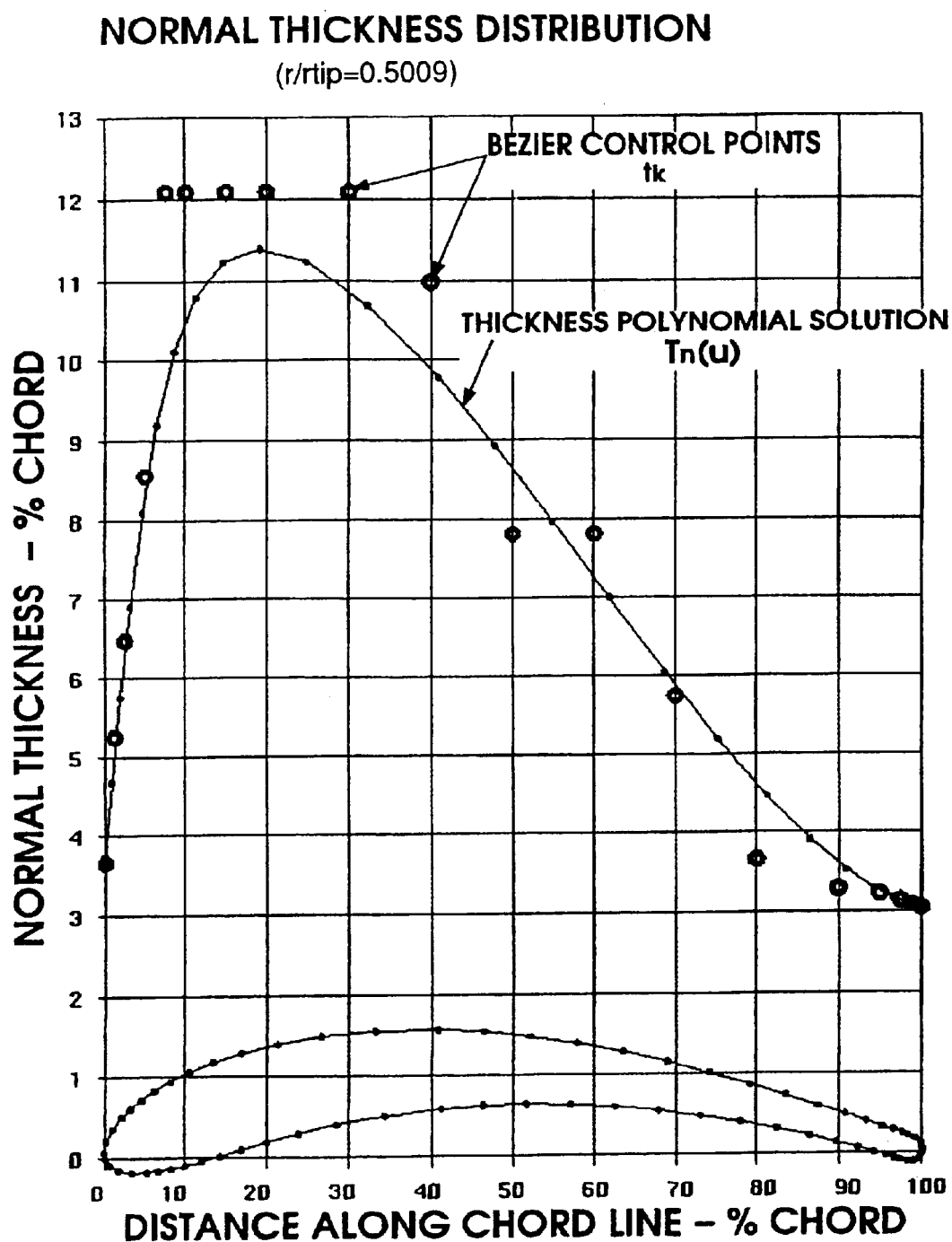
FIG. 15 is a graphical representation of the normal thickness distribution at the root portion of the preferred embodiment in accordance with the present invention along with the associated optimized normalized Bezier control points.
Figure 16:
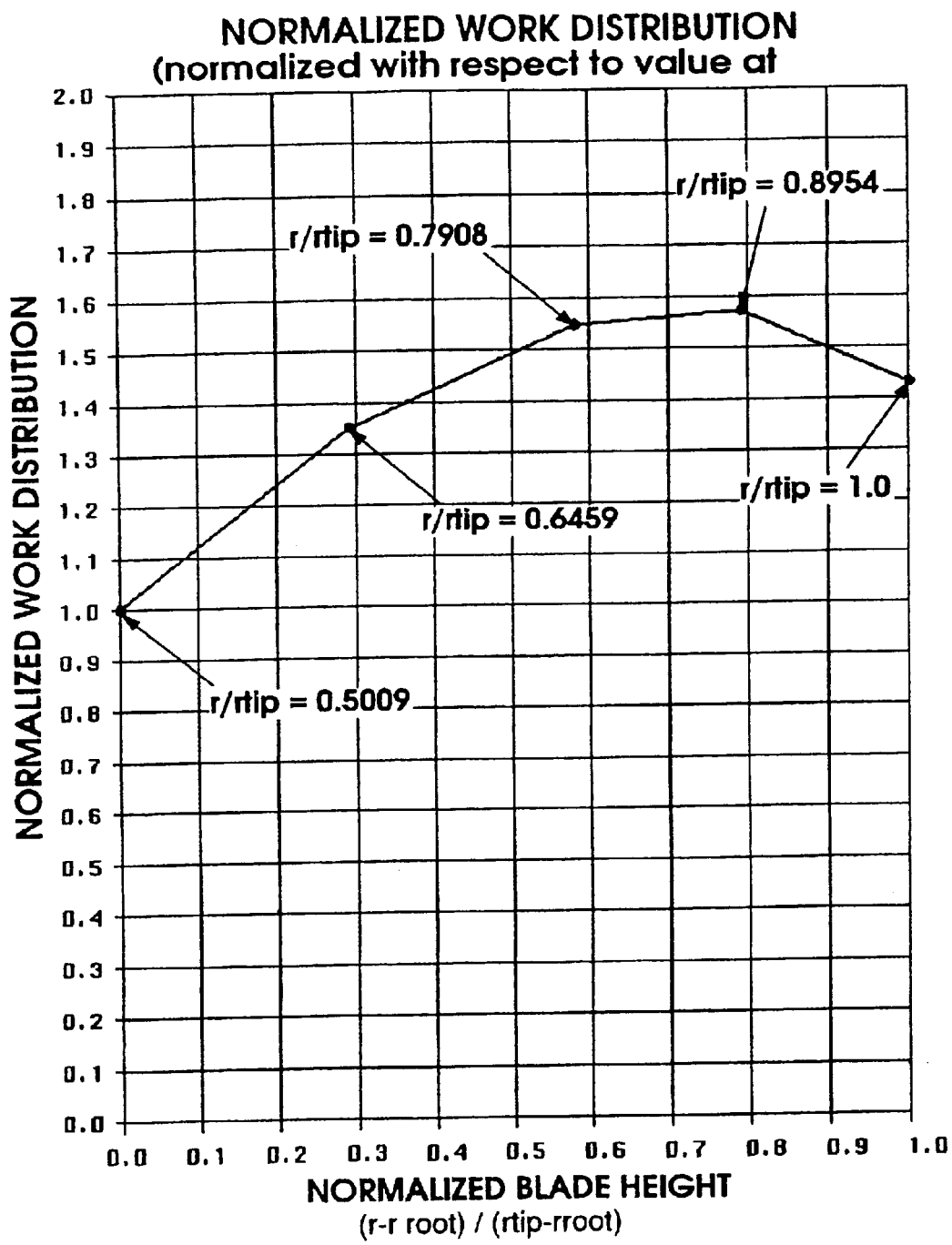
FIG. 16 is a graphical representation of the normalized work distribution of the preferred embodiment in accordance with the present invention.
Figure 17:
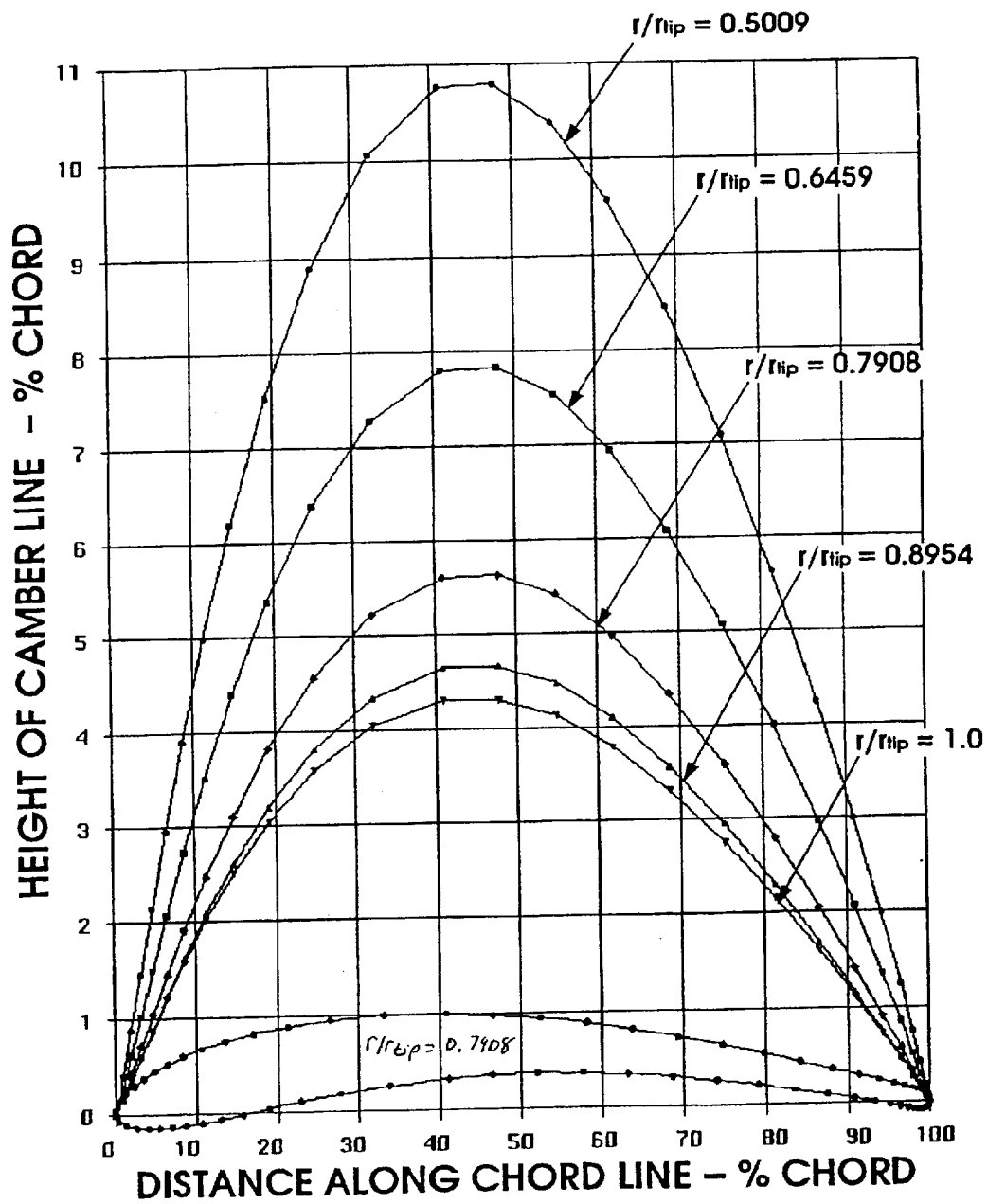
FIG. 17 is a graphical representation of the camber line distribution of the five airfoil sections of the preferred embodiment in accordance with the present invention.
Figure 18:
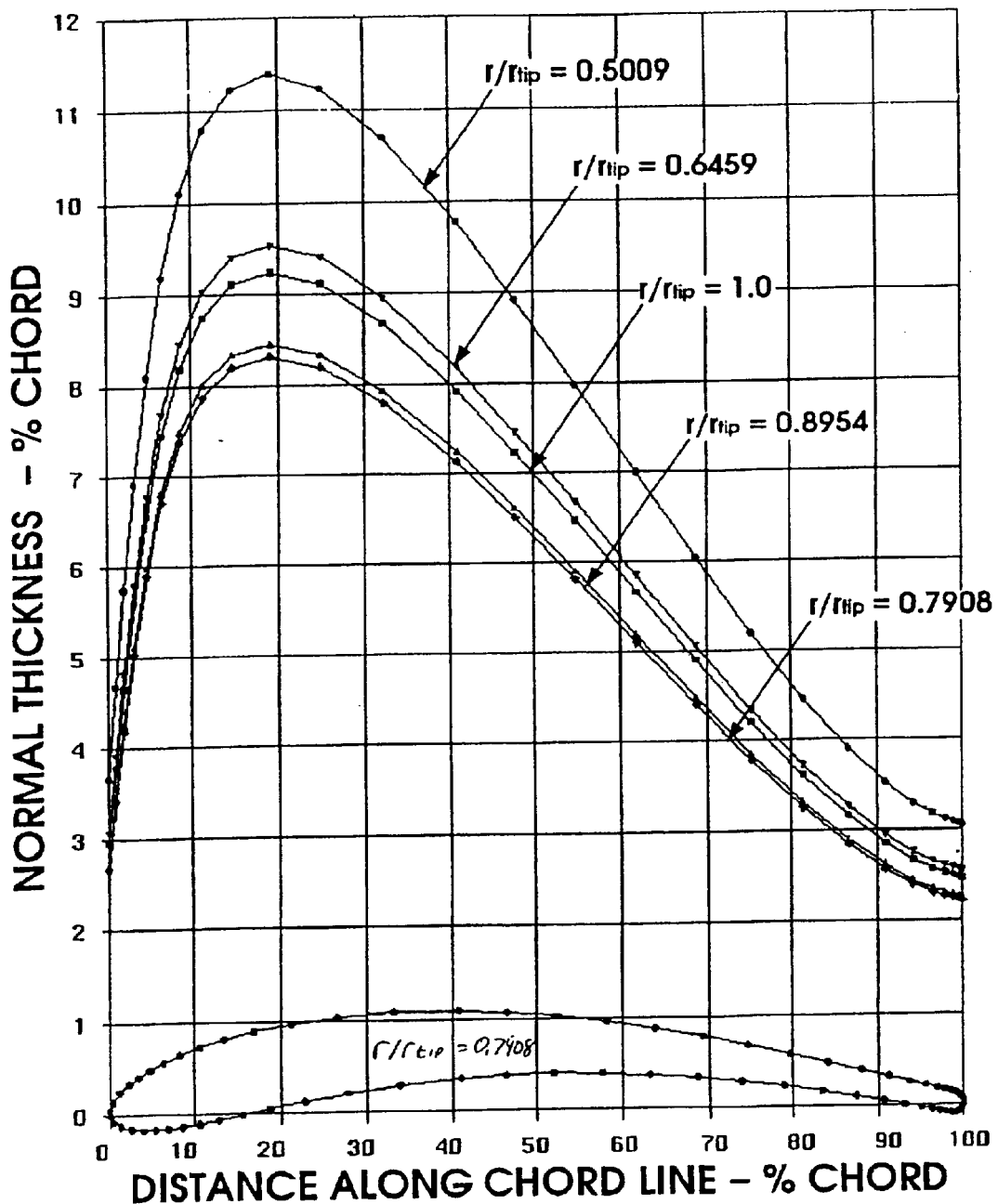
FIG. 18 is a graphical representation of the thickness distribution of the five airfoil sections of the preferred embodiment in accordance with the present invention.

These optimized Bezier control points along with the optimized camber distribution and thickness distribution for the airfoil section 14 located at the root portion 42 are graphically represented in FIGS. 14 and 15. The work distribution is graphically represented in FIG. 16 for all five of the airfoil sections 14 of the preferred embodiment. As seen in FIG. 16, the maximum work distribution is located between the root portion and the tip portion. The camber line and thickness distributions for all five of the airfoil sections 14 of the preferred embodiment are shown in FIGS. 17 and 18 along with a representation of the cross-sectional profile at $r/r_{tip}=0.7908$.

From the optimized camber line and thickness distributions, the blade surface coordinates were determined in a manner similar to that used in the NACA families of wing sections as referenced on pages 111–13 of "Theory of wing sections" by IRA H. ABBOTT and ALBERT E. VON DOENHOFF published in 1959 by the DOVER PUBLICATIONS, INC.

The blade surface coordinates are found from the chord line 32, camber line 36, and normal thickness distributions as follows:

$$X_{UPPER}=X_c-Y_t \sin$$

$$Y_{UPPER}=Y_c+Y_t \cos$$

$$X_{LOWER}=X_c+Y_t \sin$$

$$Y_{LOWER}=Y_c-Y_t \cos$$

wherein:

$X_{UPPER}$, $Y_{UPPER}$, $X_{LOWER}$, and $Y_{LOWER}$ are the coordinates of the upper (suction) surface 22 and lower (pressure) surface 24 of the blade, respectively;

$X_c$ and $Y_c$ are the coordinates of the camber line 36;

$Y_t$ is one-half the thickness of the blade 11; and

Tan is the slope of the camber line 36 where $$\text{Tan}=dY_c/dX_c.$$

Figure 19:
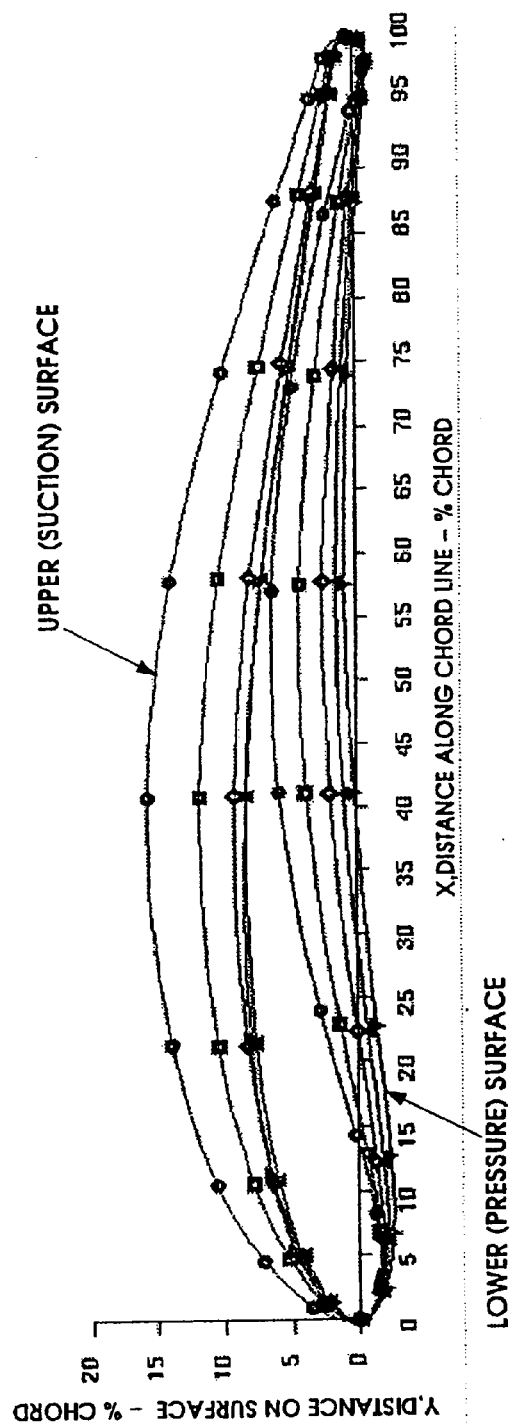
FIG. 19 is a graphical representation of the normalized profiles of the five airfoil sections of the blades of the preferred embodiment in accordance with the present invention.

The normalized cross-sectional profiles for the preferred embodiment are shown plotted in FIG. 19. FIGS. 21A–E are tabular representations of surface coordinates of the preferred embodiment in non-dimensional values.

Once the desired cross-sections 14 are found at each radial location, a three-dimensional blade 11 is formed by stacking circumferentially and axially each of the five cross-sections 14, with each cross-section 14 offset from the root portion 42 by the prescribed stacking distance. The five cross-sections 14 are blended in a smooth and continuous manner. The resulting optimum values for the five cross-sectional profiles are presented in FIG. 20. The key defining parameters are a maximum thickness located substantially constantly between about 19% chord to about 20% chord and a maximum camber located substantially constantly between about 45% chord to about 46% chord. Although these are the optimum range of values, there is an extended range of values which will substantially meet the performance parameters and design constraints in a satisfactory, although not optimum, manner. These values are a maximum thickness located substantially constantly between about 16% chord to about 23% chord and a maximum camber located substantially constantly between 40% and 51% chord.

Also seen in FIG. 20 are other key defining parameters for each cross-sectional profile such as the maximum thickness and maximum camber height (both displayed in inches and as a percentage of the chord length at the particular radial station), camber angle, stagger angle, radius, chord length, and circumferential and axial stacking distances. The maximum thickness in inches for each cross-sectional profile is characterized by a constant value. The maximum thickness as a percentage of chord length varies from a maximum value at the root portion decreasing in value to a minimum value located substantially between 79% to about 90% of a radius measured from the center of the impeller to the tip portion followed by an increase in value to the tip portion of the blade. The maximum camber height, both in inches and as a percentage of the chord length at the particular radial station, varies from a maximum camber height at the root portion continuously decreasing in maximum camber height to the tip portion of the blade.

The camber angle is characterized by a maximum value at the root portion continuously decreasing in value to the tip portion of the blade. The stagger angle, on the other hand, is characterized by a minimum value at the root portion continuously increasing in value to the tip portion of the blade. In addition, the cross-sectional profile of blades 11 may be described by its geometrical shape with the leading edge being similar to a parabola in shape, a convex upper surface, and a lower surface which is convex towards the leading edge and concave towards the trailing edge.

Other parameters in FIG. 20 include the aspect ratio and the solidity. The aspect ratio is defined as the length of the blade divided by the chord at the particular cross-section in dimensionless units. The length of the blade is defined as the radius at the tip portion ($r_{tip}$) minus the radius at the root portion ($r_{root}$). The solidity is defined as the chord length at the particular radial station divided by the blade spacing in dimensionless units. The blade spacing is the distance between adjacent blades at a given radius and is further defined by dividing 2 r by the number of blades. Finally, the normalized radius, normalized chord, and normalized circumferential and axial stacking distances are presented in FIG. 20 which are all defined in dimensionless units by dividing the value of the parameter at a particular radius station by the maximum value of that parameter. The blades discussed herein may be used in the counter-rotating impeller discussed below.

Counter-Rotating Impeller

The most important parameter in an electric fan of given physical dimensions and power input being used to cool electronic components is air flow. The more air flow which can be caused to pass over the electronic components, the more heat will be dissipated. Air flow is often measured in cubic feet per minute (CFM).

When air impelled by a fan is not restricted in any way downstream of the fan, the condition is called free-air, i.e. the static-pressure resisting the flow from the fan is zero. When air is restricted, e.g. it is forced over a set of electronic components and out of the container surrounding the electronic components, then a certain amount of static pressure will build up. How much static pressure will build up given a specific air flow depends upon many physical parameters including the configuration of the electronic components to be cooled, the size of the container surrounding the electronic components and how the container is vented to the atmosphere. That is, a very complicated set of electronic components in a small box with limited ventilation will result in a relatively high static pressure while a simple set of electronic components in a larger and better ventilated container will result in a relatively low static pressure for the same amount of air flow.

Classical air flow theory predicts that placing two fans coaxially in series with one another results in a minimal increase in air flow for free-air, i.e. in the case where there is essentially no back-pressure downstream of the fans. Classical theory also predicts that as the back pressure increases the air flow of the coaxial set of fans may increase by a factor of up to 2 over the single fan case.

Figure 6A:
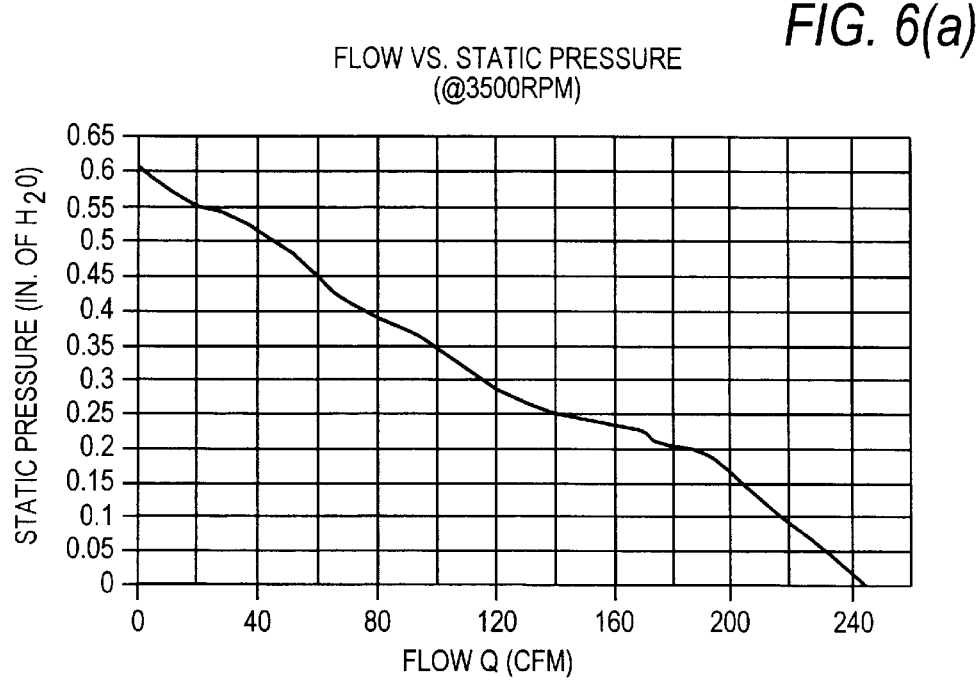
FIG. 6(a) is a graphical representation of Flow ($ft^3$/min.) vs. Static Pressure (inches of $H_2O$) for a single impeller axial flow fan.

FIG. 6(a) is a graphical representation of Air flow (CFM) vs. Static Pressure (inches of $H_2O$) for a fan manufactured by IMC and designated the 5910 series tube-axial fan. As can be seen from FIG. 6(a), the air flow value for free-air condition is approximately 240 CFM while at a static pressure value of approximately 0.6 inches of $H_2O$, the air flow is 0 CFM.

Figure 6B:
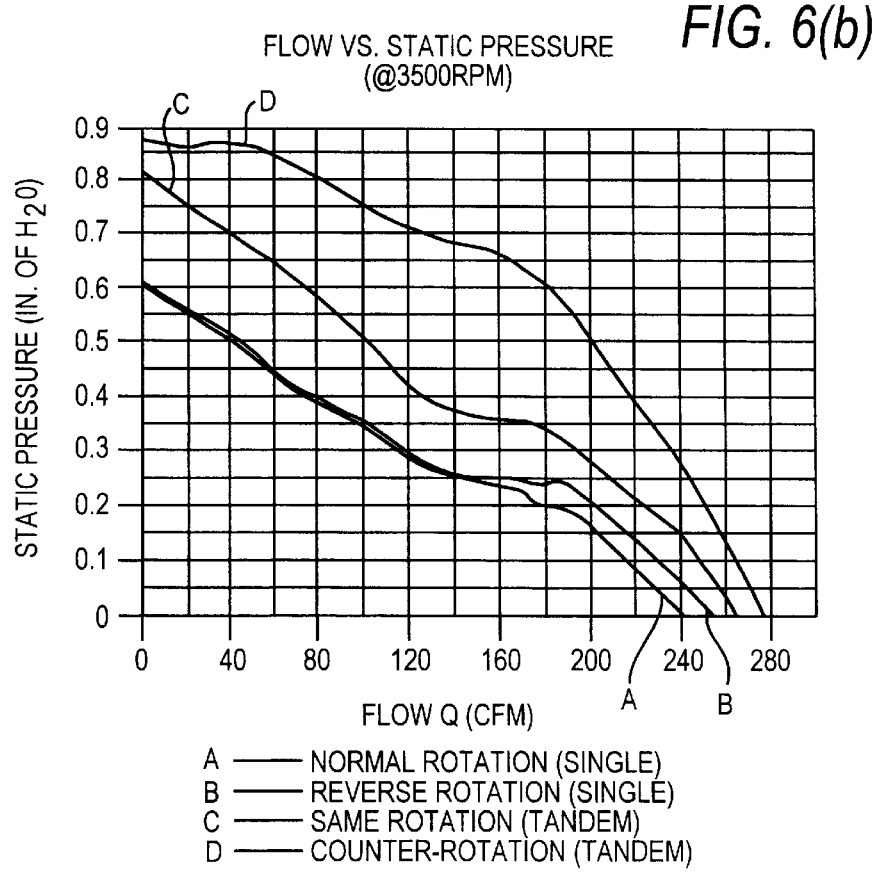
FIG. 6(b) is a graphical representation of Flow ($ft^3$/min.) vs. Static Pressure (inches of $H_2O$) for the following four separate axial flow fans: (A) a single impeller axial flow fan with normal rotation and normally pitched blades; (B) a single impeller axial flow fan with reverse rotation and reverse pitched blades; (C) a two impeller co-rotating axial flow fan, where both impellers have normal rotation and normally pitched blades; and (D), in accordance with the present invention, a two impeller counter rotating axial flow fan, where one impeller has normal rotation and normally pitched blades and the other impeller has reverse rotation and reverse pitched blades.

Tests were conducted with two coaxial IMC 5910 series tube axial fans. The fans were placed coaxially and adjacent to each other. Measurements of flow vs. static pressure were taken for these fans rotating in the same direction and counter-rotating (opposite directions). The results of these tests are shown at FIG. 6(b). As can be seen in FIG. 6(b), classical air flow theory is followed regarding the fans rotating in tandem, i.e. there is only a marginal increase in air flow for a free-air condition which increases only gradually as the static pressure is increased.

The counter-rotating impeller structure in accordance with the invention is shown in FIG. 7(d). The counter-rotating blades force air in the same direction because the pitch of the second impeller is the opposite of that of the first impeller. As can be seen in FIG. 6(b), classical air flow theory fails to properly predict the air flow for a given static pressure. Although for the free-air case, the increase in air flow is still only marginal, the increase in air flow is more immediate and drastic for the counter-rotating preferred embodiment of the invention.

The aerodynamic effects which may explain this marked increase in air flow efficiency are grouped into two major categories: profile drag and secondary flow. Profile drag makes up everything from impeller blade shape and surface finish, turbulent air created by the impeller, even drag created by the blades. The turbulent air created by the impeller is shown in FIG. 7(a). Secondary flow consists of mainly swirling flow (radial velocity) and air flow losses due to the internal wall of the fan. An illustration of swirling flow is shown in FIG. 7(b). This flow is caused by the interaction of the air with the blades of the impeller and the constraining walls of the tube which encloses the impeller. All of these aerodynamic effects reduce the efficiency of the fan.

"In theory", i.e. without consideration of complicated aerodynamic factors, fan efficiency is 100%. Taking into consideration all aerodynamic factors, the efficiency of the fan can be reduced to well below 50%. In the case of the same-rotation test these effects are intensified. Inlet air is, in theory, laminar (free flowing with no turbulence). After the air leaves the first fan, it is turbulent and flows in a "corkscrew" fashion downstream. This turbulent air is now an inlet for another fan rotating in the same direction. The final downstream air corkscrews even more. These unwanted aerodynamic effects severely hurt the overall fan efficiency.

To maintain a high efficiency in an axial fan, a designer wants to minimize the aerodynamic effects as much as possible. Design constraints permitting, the best configuration for an axial fan is: use pre-rotating stators to change the direction of the inlet air into rotor blade, and use straightening stators to correct the flow back into free stream flow as much as possible. Such an idealized configuration is illustrated at FIG. 7(c). Such an idealized structure will significantly minimize the secondary flow effects and, therefore, keep aerodynamic efficiency (and overall fan efficiency) at a higher level.

As shown in FIG. 7(d), the use of counter-rotating impellers of the present invention accomplishes the same effect as the idealized structure of FIG. 7(c). The laminar flow of air input to the first impeller is "pre-rotated" by the first impeller which increases both axial and radial (swirling) flows downstream. These flows are then "straightened" by the second impeller rotating coaxially in the opposite direction. The second fan increases the axial flow further and regains most of the radial (swirling) flow otherwise lost in the system. Now that the swirling caused by the first impeller is all but canceled out by the second, aerodynamic efficiency is greater. This greater efficiency helps improve total air flow of the system.

The invention further contemplates the method of locating N substantially coaxial impellers within a housing, wherein N is an integer; rotating at least one impeller in a direction opposite to the direction of rotation of a first impeller of said N impellers; operating the impellers to force air in the same direction; and generating an air flow from the N impellers in the housing that is greater than N times the air flow of a single impeller, provided that the static pressure at the fan output is greater than some minimum pressure. The static pressure is dependent upon the characteristics of the specific fan, including the size of the fan. For example, the static pressure is approximately 0.3 inches of water for a fan with two counter-rotating impeller and a diameter six inches.

FIG. 6(b) shows that when operating in an optimal pressure range, the air flow of two counter-rotating impellers can be substantially greater than twice the air flow of a single normal rotating impeller operating in the same environment for some static pressure values, i.e. the same housing for establishing the back pressure conditions. In addition, the counter-rotating impellers of the invention, provide substantially greater air flow than the air flow generated by two impellers rotating in the same direction as shown in FIG. 6(b).

The invention may include multiple substantially coaxial impellers. At least one impeller rotates in the opposite direction. Thus, there may be N impellers where N is an integer. If N is an even number half the impellers may rotate in a first direction and half may rotate in the opposite direction. The direction of rotation may alternate between adjacent impellers. All the impellers may be identical, in which case the total air flow is substantially greater than N times the air flow for a single impeller operating in the same environment above, provided that the static pressure at the output of the fan is greater than some minimum pressure. If the impellers are not identical, the total air flow is substantially greater then the sum of the air flow of each impeller of the N impellers operating in the same environment, provided that the static pressure at the output of the fan is greater than some minimum pressure.

The multiple impellers of the coaxial counter-rotating structure may have blades such as those of the IMC 5910 series or the blades described above in the section entitled "Parameters of the Blade Structures".

The first and second impellers each have their own separate motor and the stators of the motors are oppositely wound normal to generate rotation in opposite directions. Alternatively, the motors may share a shaft.

To summarize, the present invention provides an axial flow fan with novel circuitry and housing, and a novel blade consisting of a plurality of airfoil sections blended together which allow the axial width of an axial flow fan to be reduced while maintaining the desired performance parameters and design constraints. The present invention also discloses a plurality of coaxial counter-rotating impellers with much greater air flow values at given static pressure values than would be expected under classical theories. In addition, the blades enable a multiplicity of coaxial counter-rotating impellers to be exploited to their greatest possible advantage despite design constraints regarding the dimensional parameters for electric motors used in cooling electronic components.

Further, additional air flow or acoustic advantages can be achieved for the counter-rotating axial flow fan of the present invention by implementing one or more of the following design improvements:

attaching a different number of blades to the reverse rotating impellers than are attached to the normal rotating impellers(which reduces the noise signature of the fan);

determining the diameter of an impeller based upon the axial location of that impeller within the fan such that the diameter of an impeller near the outlet of the fan is greater than the diameter of an impeller near the inlet of the fan (which increases the airflow); and placing the impellers into a cone shaped housing, where the diameter of the conic sections increase from the inlet of the fan to the outlet of the fan (as shown in FIG. 7(e) which increases the airflow).

Now that the preferred embodiments of the present invention have been shown and described in detail, various modifications and improvements thereon will become readily apparent to those skilled in the art. For example, minor deviations from the disclosed values and approximations of the disclosed equations are intended to be within the spirit of the invention. Further, minor deviations or differences due to blending of the cross-sectional designs or due to different blending approaches are intended to be within the spirit and scope of the invention. A viable product may be obtained for substantially the same performance parameters and design constraints, or where differences in the performance parameters and design constraints have little commercial significance, by varying the methods of design in minor ways such as choosing a different value for the number of control points, choosing a different value for the number of cross-sectional profiles, choosing a different value for the number of blades, defining the cross-sectional profiles by different radial distances, or choosing a different stacking distance, stagger angle, camber angle, or chord length, where the differences in values are minor. The drawings and descriptions of the preferred embodiments are made by way of example rather than to limit the scope of the inventions, and they are intended to cover, within the spirit and scope of the inventions, all such changes and modifications stated above.

What is claimed is:

1. A cooling fan comprising:
    a first impeller and a second impeller substantially identical to the first impeller except that the second impeller has oppositely pitched airfoil blades as compared to the first impeller;
    said first and said second impellers adapted for location within a single housing; where
        the first impeller rotates in a first direction and the second impeller rotates in a direction opposite to the direction of the first impeller;
        the second impeller forces air in the same axial direction as the first impeller; and
        the air flow of said impellers in said housing is substantially greater than the air flow of an equivalent co-rotating fan using two impellers identical to said first impeller.

2. An axial flow fan comprising:
    a plurality of non-concentric impellers substantially centered about a single axis of rotation, where said plurality of impellers includes at least a first impeller and a second impeller;
    one or more stator assemblies;
    a means to connect each impeller to a stator assembly whereby each impeller is free to rotate about the axis of rotation but is otherwise fixed in place;
    a bipolar motor for rotating said first impeller in a first direction; and
    a bipolar motor for rotating said second impeller in a direction opposite to the first direction; wherein
        each impeller of said plurality of impellers comprises a ring and a plurality of airfoil blades;
        the plurality of airfoil blades of said second impeller being a different number of airfoil blades than the plurality of airfoil blades of said first impeller;
        the plurality of airfoil blades of said first impeller configured so as to cause air to flow in a direction substantially parallel to the axis of rotation when said first impeller is rotated;
        the plurality of airfoil blades of said second impeller configured so as to cause air to flow in the same axial direction as the air flow generated by said first impeller when the second impeller is rotated in the opposite direction of said first impeller.

3. The axial flow fan of claim 2 wherein said first impeller has thirteen airfoil blades and said second impeller has eleven airfoil blades.

4. A cooling fan comprising:

N substantially coaxial impellers where each impeller is comprised of airfoil blades; and where at least one impeller is counter-rotating relative to the direction of rotation of a first impeller of the N impellers, wherein N is an integer, and the N impellers force air in the same direction, said impellers adapted for location within a housing, and the air flow of said impellers in said housing being greater than the sum of the air flow of each impeller of the N impellers taken alone, provided that the static pressure at the outlet of the fan is greater than some minimum pressure.

5. A cooling fan comprising:

N substantially coaxial and substantially identical impellers where each impeller is comprised of airfoil blades; and where at least one impeller is counter-rotating relative to the direction of rotation of a first impeller of the N impellers, wherein N is an integer, and the N impellers force air in the same direction, said impellers adapted for location within a housing, and the air flow of said impellers in said housing being greater than N times the air flow of one of said single impellers, provided that the static pressure at the outlet of the fan is greater than some minimum pressure.

6. The cooling fan of claim 5 wherein:

N is equal to 2 and the minimum pressure is equal to 0.3 inches of water.

7. An axial flow fan comprising:

a plurality of non-concentric impellers substantially centered about a single axis of rotation, where said plurality of impellers includes at least a first impeller and a second impeller;

one or more stator assemblies;

a means to connect each impeller to a stator assembly whereby each impeller is free to rotate about the axis of rotation but is otherwise fixed in place;

a bipolar motor for rotating said first impeller in a first direction; and a bipolar motor for rotating said second impeller in a direction opposite to the first direction; wherein each impeller of said plurality of impellers comprises a ring and a plurality of airfoil blades, the plurality of airfoil blades of said first impeller configured so as to cause air to flow in a direction substantially parallel to the axis of rotation when the first impeller is rotated;

the plurality of airfoil blades of said second impeller configured so as to cause air to flow in the same axial direction as the air flow generated by the first impeller when the second impeller is rotated in the opposite direction of the first impeller.

8. The axial flow fan of claim 7 wherein:

the airfoil blades having a cross-sectional shape, taken anywhere along a radius of said airfoil blade, characterized by a maximum thickness located substantially constantly between about 16% chord to about 23% chord and a maximum camber located substantially constantly between about 40% chord to about 51% chord.

9. An axial flow fan for cooling electronic components comprising:

a plurality of non-concentric impellers substantially centered about a single axis of rotation, where said plurality of impellers includes at least a first impeller and a second impeller;

one or more stator assemblies;

a means to connect each impeller to a stator assembly whereby each impeller is free to rotate about the axis of rotation but is otherwise fixed in place;

a means to rotate said first impeller in a first direction; and a means to rotate said second impeller in a direction opposite to the first direction; wherein each impeller of said plurality of impellers comprises a ring and a plurality of airfoil blades;

the plurality of airfoil blades of said first impeller configured so as to cause air to flow in a direction substantially parallel to the axis of rotation when the first impeller is rotated;

the plurality of airfoil blades of said second impeller configured so as to cause air to flow in the same axial direction as the air flow generated by the first impeller when the second impeller is rotated in the opposite direction of the first impeller.

10. The axial flow fan of claim 9 further comprising a housing into which the plurality of impellers is enclosed.

11. The axial flow fan of claim 10 wherein the housing is cone shaped.

12. The axial flow fan of claim 9 further comprising:

airfoil blades for the impellers having a root portion, a tip portion, a leading edge, and a trailing edge, said airfoil blades having:

a cross-sectional shape, taken anywhere along a radius of said airfoil blades, characterized by a maximum thickness located substantially constantly as a percentage of chord and a maximum camber located substantially constantly as percentage of chord.

13. The axial flow fan of claim 9 further comprising:

airfoil blades for the impellers having a root portion, a tip portion, a leading edge, and a trailing edge, said airfoil blades having:

a cross-sectional shape, taken anywhere along a radius of said airfoil blades, characterized by a maximum thickness located substantially constantly between about 16% chord to about 23% chord and a maximum camber located substantially constantly between about 40% chord to about 51% chord.

14. The axial flow fan of claim 9 further comprising:

airfoil blades for the impellers having a root portion, a tip portion, a leading edge, a trailing edge, said airfoil blades being characterized:

in plan form wherein each of said airfoil blades is varied from said root portion to said tip portion with a maximum chord located between said root portion and said tip portion, said leading edge and said trailing edge of said airfoil blades are convex from said root portion to said tip portion; and a cross-sectional shape, taken anywhere along a radius of said airfoil blades, characterized by a maximum thickness located substantially constantly as a percentage of chord.

15. The axial flow fan of claim 14 where said maximum thickness is located substantially constantly between about 16% chord to about 23% chord.

16. The axial flow fan of claim 14 where said maximum camber located substantially constantly between about 40% chord to about 51% chord.

17. The axial flow fan of claim 9 further comprising:

airfoil blades for the impellers having a root portion, a tip portion, a leading edge, a trailing edge, said airfoil blades being characterized:
- in plan form wherein each airfoil blade is varied from said root portion to said tip portion with a maximum chord located between said root portion and said tip portion, said leading edge and said trailing edge of each airfoil blade are convex from said root portion to said tip portion; and
- a cross-sectional shape, taken anywhere along a radius of said airfoil blade, characterized by said leading edge being similar to a parabola in shape, a convex upper surface, and a lower surface which is convex towards said leading edge and concave towards said trailing edge.

18. The axial flow fan of claim 9 further comprising:

airfoil blades for the impellers having a root portion, a tip portion, a leading edge, a trailing edge, said airfoil blades having:
- a cross-sectional shape, taken anywhere along a radius of each airfoil blade, characterized by a maximum thickness located substantially constantly as a percentage of chord, a maximum camber located substantially constantly as percentage of chord, said leading edge being similar to a parabola in shape, a convex upper surface, and a lower surface which is convex towards said leading edge and concave towards said trailing edge.

* * * * *